(12) United States Patent
Ouji

(10) Patent No.: US 6,622,096 B1
(45) Date of Patent: Sep. 16, 2003

(54) METHOD OF SETTING FLOW COEFFICIENT AND FLOW METER USING THE SAME

(75) Inventor: Kenzo Ouji, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/830,202
(22) PCT Filed: Oct. 25, 1999
(86) PCT No.: PCT/JP99/05889
§ 371 (c)(1), (2), (4) Date: Aug. 1, 2001
(87) PCT Pub. No.: WO00/25096
PCT Pub. Date: May 4, 2000

(51) Int. Cl.[7] .............................. G06F 19/00
(52) U.S. Cl. ........................................ 702/45
(58) Field of Search .................... 702/45, 6; 60/39; 73/861, 204, 28; 347/7, 170; 415/17; 123/520

(56) References Cited

U.S. PATENT DOCUMENTS 5,960,369 A * 9/1999 Samaroo ................ 702/6

FOREIGN PATENT DOCUMENTS

| JP | 08082540 A | * | 9/1994 |
| JP | 8-82540 | | 3/1996 |
| JP | 08082540 | * | 3/1996 |
| JP | 10-206203 | | 8/1998 |
| JP | 410206203 A | * | 8/1998 |

* cited by examiner

Primary Examiner—John Barlow
Assistant Examiner—Tung Lau
(74) Attorney, Agent, or Firm—Snell & Wilmer, LLP

(57) ABSTRACT

The present invention relates to a method of setting a flow coefficient used in a flow meter for measuring a flow rate of a fluid, and a flow meter having the flow coefficient which is set by the flow coefficient setting method. An object of the present invention is to provide a method for efficiently providing an optimal approximate line represented by a low-degree function such that flow coefficients including a number of data sets are within a predetermined error, and to provide a flow meter with a reduced error. In order to achieve the object, the present invention includes the steps of: obtaining an optimal approximate line using a number n of consecutive sets of data points $(X_i, Y_i)$; increasing or decreasing the number n so that the n sets of data points are all within a predetermined error $E_r$ with respect to the optimal approximate line; and setting a region. Thus, it is possible to easily and automatically set a flow coefficient using a personal computer, or the like, with high efficiency and good reproducibility.

24 Claims, 22 Drawing Sheets

METHOD OF SETTING FLOW COEFFICIENT AND FLOW METER USING THE SAME

TECHNICAL FIELD

The present invention relates to a method of setting a flow coefficient used in a flow meter for measuring a flow rate of a fluid.

BACKGROUND ART

A conventional flow meter will be described with reference to FIG. 21. A flow velocity measurement device 2 for measuring a flow velocity of a fluid, such as a thermal type flow sensor, is provided at a point in a fluid pipe 1 where a fluid passes therethrough. The flow velocity (Vm) obtained by the flow velocity measurement device 2 is multiplied by a cross-sectional area (S) of the fluid pipe 1 and a flow coefficient (K), so as to calculate a flow rate (Qm). The flow velocity measurement device 2 obtains the flow velocity (Vm) of the fluid by measuring the flow velocity of only a portion of the fluid in the vicinity of the flow velocity measurement device 2. Therefore, an average flow velocity for the entire area of the fluid pipe 1 needs to be calculated as follows. A reference flow rate setting section capable of setting a reference flow rate is connected to the fluid pipe 1 so as to pass a fluid at an appropriate reference flow rate through the fluid pipe 1 and obtain an average flow rate (Qa). Then, the relationship (K=Va/Vm; "flow coefficient") between an average flow velocity (Va), which is calculated from the average flow rate value and the flow velocity (Vm) measured by the flow velocity measurement device is obtained. This relationship is measured for various reference flow rates so as to obtain a number of data Bets each including the flow velocity (Vm) and the flow coefficient (K) of the fluid.

Next, the flow velocity (Vm) of the fluid measured by the flow velocity measurement device 2 is multiplied by the flow coefficient (K) and the cross-sectional area (S) of the fluid pipe 1, thereby obtaining a measured flow rate (Qm). In other words, the measured flow rate (Qm) is obtained by calculating Qm=K·S·Vm. In FIG. 21, an arrow 3 denotes the direction of the fluid flow. FIG. 22 illustrates a relationship between the flow velocity (Vm) and the flow coefficient (K) which are obtained as described above. In FIG. 22, the horizontal axis represents the flow velocity (Vm) measured by the flow velocity measurement device, and the vertical axis represents the flow coefficient (K). For example, if the flow velocity (Vm) of the fluid measured by the flow velocity measurement device 2 is about 2 m/s, the flow coefficient (K) can be read from FIG. 22 to be about 0.89. Therefore, if the cross-sectional area (S) of the fluid pipe 1 is about $0.3 \times 10^{-3}$ m$^2$, the measured flow rate (Qm) is:

$$Qm = 2 \times 0.89 \times 0.3 \times 10^{-3} \text{ m}^3/\text{s}$$
$$= 0.534 \times 10^{-3} \text{ m}^3/\text{s}$$
$$= 1.9 \text{ m}^3/\text{h}.$$

The conventional flow meter has the following problems. That is, using a number of sets of data (see FIG. 22) each including the flow velocity (Vm) and the flow coefficient (K) measured by the flow velocity measurement device, the flow velocity range is appropriately divided into regions by visual observation so as to set an optimal approximate line for each region which optimally approximates a group of data sets (flow coefficients) within the region, thereby obtaining a kinked line which optimally approximates the group of data sets (flow coefficients) across all regions.

It is time consuming and labor intensive to set such an optimal approximate straight line by repeatedly performing complicated calculations. Moreover, because the setting operation is based on a visual observation, it has a poor reproducibility, and the obtained optimal approximate straight line may vary each time it is set. Although the optimal flow coefficient may be approximated by a high-degree curve, a low-degree approximation such as a linear or quadric approximation is preferred when the calculation is done by a microcomputer, or the like, because of the limitations associated with the use of a microcomputer such as the calculation time and the number of significant digits.

When the type of a fluid is changed from that used when measuring the reference flow rate and setting the flow coefficient, it is necessary to re-measure the average flow rate (Qa) and the flow velocity (Vm) of the new fluid so as to re-set a new flow coefficient (K).

When the temperature of the fluid changes, the characteristics of the fluid may also change, thereby changing the flow coefficient and deteriorating the flow rate measurement precision.

DISCLOSURE OF THE INVENTION

The present invention has been made to solve the above-described problems and provides a method of setting a flow coefficient, including the steps of: obtaining an optimal approximate line using a number n of consecutive sets of data points (Xi, Yi) of all flow velocity data points measured by a flow velocity measurement section, and reference data stored in a reference data memory section; increasing or decreasing the number n so that the n sets of data points are all within a predetermined error Er with respect to the optimal approximate liner performing a calculation operation for setting a region by a flow coefficient calculation section; and storing an obtained flow coefficient in a flow coefficient memory section.

With such a structure, according to the flow coefficient setting method of the present invention having such a structure, it is possible to easily and automatically set a flow coefficient using a personal computer, or the like, with good reproducibility, while suppressing the flow rate value within a predetermined error.

Another method of setting a flow coefficient of the present invention includes the steps of: obtaining an optimal approximate curve using a plurality of sets of data points (Xi, Yi) of all flow velocity data points measured by a flow velocity measurement section, and reference data stored in a reference data memory section, dividing the optimal approximate curve into a number m of regions; performing a calculation operation for approximating each region with an optimal approximate straight line by a flow coefficient calculation section; and storing an obtained flow coefficient in a flow coefficient memory section.

With such a structure, even if the number of data points available is limited, it is possible to select an optimal curve so that a flow coefficient can be set with a reduced error over a wider range, in a more efficient manner and within a shorter period of time.

A flow meter of the present invention includes: a flow velocity measurement section for measuring a flow velocity of a fluid; a flow coefficient memory section for storing a flow coefficient which is set by the above-described method of setting a flow coefficient; and a flow rate calculation section for calculating a flow rate of the fluid from the measured flow velocity using the flow coefficient stored in the flow coefficient memory section.

With such a structure, it is possible to provide a flow meter with a reduced error over a wide flow rate range.

Various embodiments of the present invention will be described below.

A method of setting a flow coefficient according to one embodiment of the present invention includes the steps of: obtaining an optimal approximate line using a number n of consecutive sets of data points (Xi, Yi) of all flow velocity data points measured by a flow velocity measurement section, and reference data stored in a reference data memory section; increasing or decreasing the number n so that the n sets of data points are all within a predetermined error Er with respect to the optimal approximate line; performing a calculation operation for setting a region by a flow coefficient calculation section; and storing an obtained flow coefficient in a flow coefficient memory section.

With such a structure, according to the flow coefficient setting method of the present invention having such a structure, it is possible to easily and automatically set a flow coefficient using a personal computer, or the like, with good reproducibility, while suppressing the flow rate value within a predetermined error.

In a method of setting a flow coefficient according to one embodiment of the present invention, a linear function is used to represent the optimal approximate line if the n sets of data points (Xi, Yi) are distributed on both sides of the optimal approximate line in a middle portion of the optimal approximate line.

With such a structure, it is possible to set a flow coefficient with a simple linear function and thus to obtain a flow rate value with a reduced error by a a simple calculation.

In a method of setting a flow coefficient according to one embodiment of the present invention, a quadric function is used to represent the optimal approximate line if the n sets of data points (Xi, Yi) are distributed on one side of the optimal approximate line in a middle portion of the optimal approximate line.

With such a structure, it is possible to approximate a wider range, as compared with when using a linear function, using a curve with a reduced error.

A method of setting a flow coefficient according to one embodiment of the present invention includes the steps of: obtaining an optimal approximate curve using a plurality of sets of data points (Xi, Yi) of all flow velocity data points measured by a flow velocity measurement section, and reference data stored in a reference data memory section; dividing the optimal approximate curve into a number m of regions; performing a calculation operation for approximating each region with an optimal approximate straight line by a flow coefficient calculation section; and storing an obtained flow coefficient in a flow coefficient memory section.

With such a structure, even if the number of data points available is limited, it is possible to select an optimal curve so that a flow coefficient can be set with a reduced error over a wider range, in a more efficient manner and within a shorter period of time.

In a method of setting a flow coefficient according to one embodiment of the present invention, the optimal approximate curve is equally divided into the number m of regions along a y-axis direction.

With such a structure, it is possible to divide a data range into m regions along a y-axis direction within a shorter period of time, thereby efficiently setting a flow coefficient.

In a method of setting a flow coefficient according to one embodiment of the present invention, the optimal approximate curve is equally divided into the number m of regions along an x-axis direction.

With such a structure, it is possible to divide a data range into m regions along an x-axis direction within a shorter period of time, thereby efficiently setting a flow coefficient.

In a method of setting a flow coefficient according to one embodiment of the present invention, the optimal approximate curve is divided into the number m of regions along an x-axis direction such that a width of each region is inversely proportional to a gradient of the optimal approximate straight line for the region.

With such a structure, it is possible to divide a data range into m regions within a shorter period of time, while efficiently setting a flow coefficient so that the errors of the respective regions are close to one another.

In a method of setting a flow coefficient according to one embodiment of the present invention, the optimal approximate curve is represented by $Y=a \times Log(X)+b$.

With such a structure, it is possible to divide a setting range into m regions to linearly approximate each region with as few as two data points.

In a method of setting a flow coefficient according to one embodiment of the present invention, the optimal approximate curve is represented by $Y=(a-b)/[1+\exp(-c \times X)]+b$.

With such a structure, it is possible to divide a wide setting range into n regions to linearly approximate each region with a small number of data points.

In a method of setting a flow coefficient according to one embodiment of the present invention, the flow velocity measurement section includes a thermal type flow sensor.

With such a structure, it is possible to set a flow coefficient with a reduced error and a good reproducibility particularly in a low flow rate region.

In a method of setting a flow coefficient according to one embodiment of the present invention, the flow velocity measurement section includes an ultrasonic flow meter.

With such a structure, it is possible to set a flow coefficient with a reduced error and a good reproducibility over a wide flow rate range.

In a method of setting a flow coefficient according to one embodiment of the present invention, the optimal approximate line is represented by a low-degree function which is a linear function or a quadric function.

With such a structure, it is possible to obtain a flow rate value with a reduced error by a simple calculation.

In a method of setting a flow coefficient according to one embodiment of the present invention, a data point which is included by two adjacent regions is set to belong to one of the two adjacent regions in which an error Er calculated based on the optimal approximate line is smaller.

With such a structure, it is possible to reduce the error for a boundary value.

In a method of setting a flow coefficient according to one embodiment of the present invention, an intersection between two optimal approximate lines for two adjacent regions is used as a boundary point between the two regions.

With such a structure, it is possible to smoothly connect the region boundary points to one another.

In a method of setting a flow coefficient according to one embodiment of the present invention, the error Er is gradually increased until an entire data range required can be divided into a predetermined number of regions.

With such a structure, even when the number of regions is prescribed, it is possible to divide a data range into the prescribed number of regions while setting a flow coefficient with a minimum error.

In a method of setting a flow coefficient according to one embodiment of the present invention, when a type of a fluid changes from a first fluid to a second fluid, an x-axis value of a flow coefficient is multiplied by a fluid-type-dependent constant so as to convert the flow coefficient to a new flow coefficient.

With such a structure, even when the type of a fluid changes from that used when setting a flow coefficient, the flow coefficient can easily be converted to a new flow coefficient for the new fluid, thereby suppressing an error which may be caused by such a change in the type of a fluid.

In a method of setting a flow coefficient according to one embodiment of the present invention, the constant is a new flow velocity (Vm×Vg/Vm) which is obtained by multiplying a flow velocity ratio (Vg/Vm) to a flow velocity (Vm) of the first fluid, where Vg is a flow velocity of the second fluid for any flow coefficient value (Kc).

With such a structure, even when there is a change in the type of a fluid, it is possible to update the flow coefficient using only one data point according to the type a of the fluid, thereby eliminating the need to re-measure the flow coefficient.

In a method of setting a flow coefficient according to one embodiment of the present invention, when a temperature of a fluid changes from a first temperature to a second temperature, an x-axis value of a flow coefficient is multiplied by a temperature-dependent function value so as to convert the flow coefficient to a new flow coefficient.

With such a structure, even when the temperature of the fluid changes from that when setting a flow coefficient, the flow coefficient can easily be converted to a new flow coefficient for the new temperature, thereby suppressing an error which may be caused by such a change in the temperature of the fluid.

In a method of setting a flow coefficient according to one embodiment of the present invention, the function value used for obtaining the new flow coefficient is calculated by the following expression:

$$Vi(Ts/Ti)^p$$

where Ts denotes the first temperature, Ti denotes the second temperature, Vi denotes a flow velocity of the fluid measured at Ti, and p denotes an exponent.

With such a structure, even when there is a change in the temperature of a fluid, it is possible to obtain a flow coefficient for the new temperature, thereby suppressing an error which may be caused by such a change in the temperature of the fluid.

In a method of setting a flow coefficient according to one embodiment of the present invention, an absolute temperature (Tm) of the fluid is determined from a temperature-sensitive resistor of a thermal type flow sensor.

With such a structure, it is not necessary to separately provide a temperature sensor, thereby realizing an efficient setting method.

In a method of setting a flow coefficient according to one embodiment of the present invention, an absolute temperature (Tm) of the fluid is determined from an ultrasonic wave propagation time from an ultrasonic flow meter.

With such a structure, it is not necessary to separately provide a temperature sensor, while realizing an accurate hydraulic temperature measurement utilizing the characteristics of a fluid.

A flow meter according to one embodiment of the present invention includes: a flow velocity measurement section for measuring a flow velocity of a fluid; a flow coefficient memory section for storing a flow coefficient which is set by the above-described method of setting a flow coefficient; and a flow rate calculation section for calculating a flow rate of the fluid from the measured flow velocity using the flow coefficient stored in the flow coefficient memory section.

With such a structure, it is possible to provide a flow meter with a reduced error over a wide flow rate range.

In a flow meter according to one embodiment of the present invention, the flow velocity measurement section includes a thermal type flow sensor.

With such a structure, it is possible to provide a flow meter with a reduced error and with good reproducibility particularly in a low flow rate region.

In a flow meter according to one embodiment of the present invention, the flow velocity measurement section includes an ultrasonic flow meter.

With such a structure, it is possible to provide a flow meter with a reduced error and with good reproducibility over a wide flow rate range.

BEST MODE FOR CARRYING OUT THE INVENTION (Embodiment 1)

Figure 1:
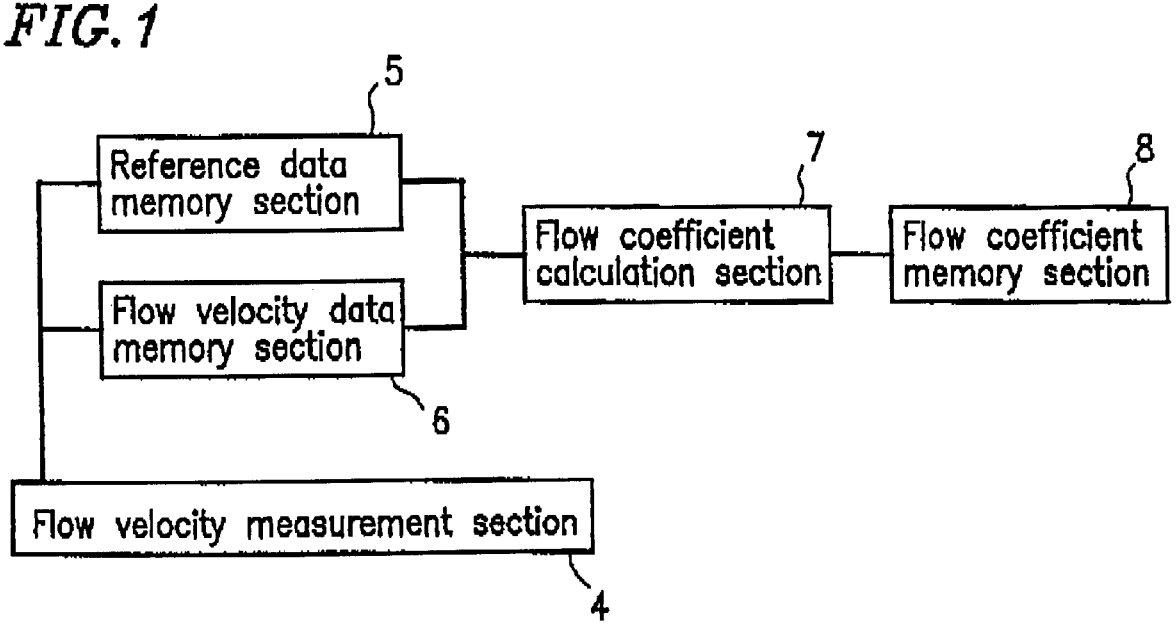
FIG. 1 is a conceptual diagram of a flow meter for illustrating Embodiment 1 of the present invention.

FIG. 1 is a conceptual diagram showing a flow meter for illustrating a method of setting a flow coefficient according to Embodiment 1 of the present invention. Referring to FIG. 1, the flow meter includes: a flow velocity measurement section 4 including a thermal type flow sensor or an ultrasonic transceiver; a reference data memory section 5 for storing a reference flow rate of a fluid; a flow velocity data memory section 6 for storing flow velocity data measured by the flow velocity measurement section 4; a flow coefficient calculation section 7 for calculating a flow coefficient; and a flow coefficient memory section 8 for storing a calculated flow coefficient.

Reference flow rate data of a fluid flowing through the flow velocity measurement section 4 is stored in the reference flow rate data memory section 5. A measured flow velocity of the fluid flowing through the flow velocity measurement section 4 is stored in the flow velocity data memory section 6. The flow coefficient calculation section 7 calculates a flow coefficient using the reference flow rate data stored in the reference flow rate data memory section 5 and the flow velocity data of the fluid stored in the flow velocity data memory section 6. The calculation results are stored in the flow coefficient memory section 8.

Figure 2:
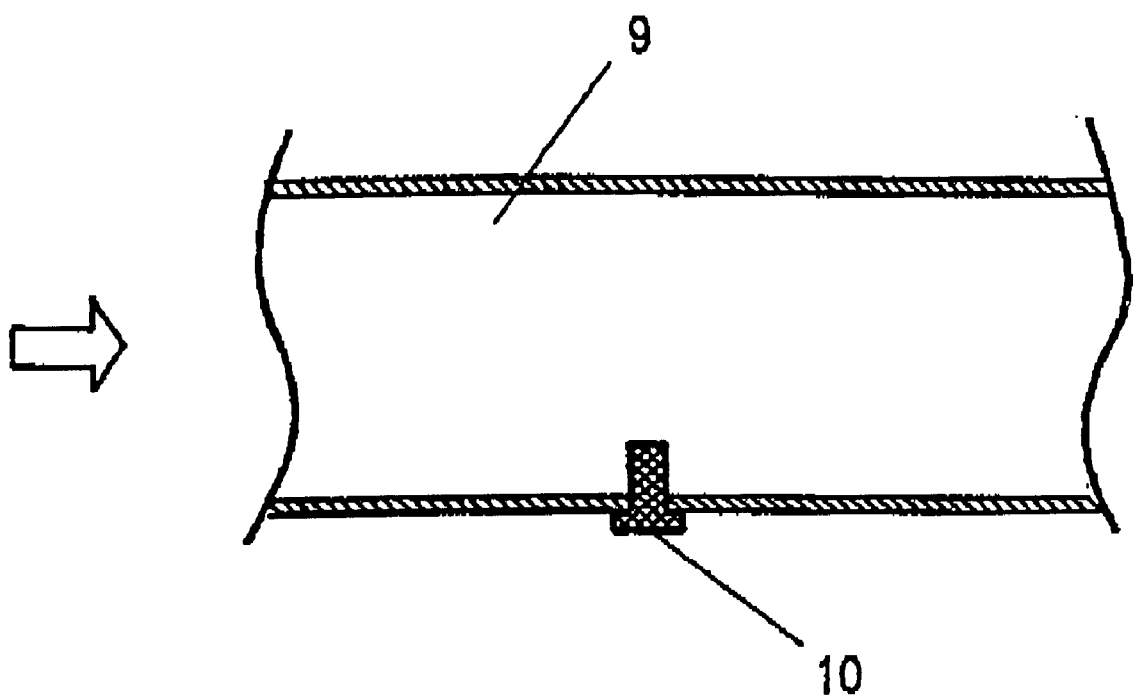
FIG. 2 shows a flow velocity measurement section including a thermal type flow sensor according to Embodiment 1 of the present invention.
Figure 3:
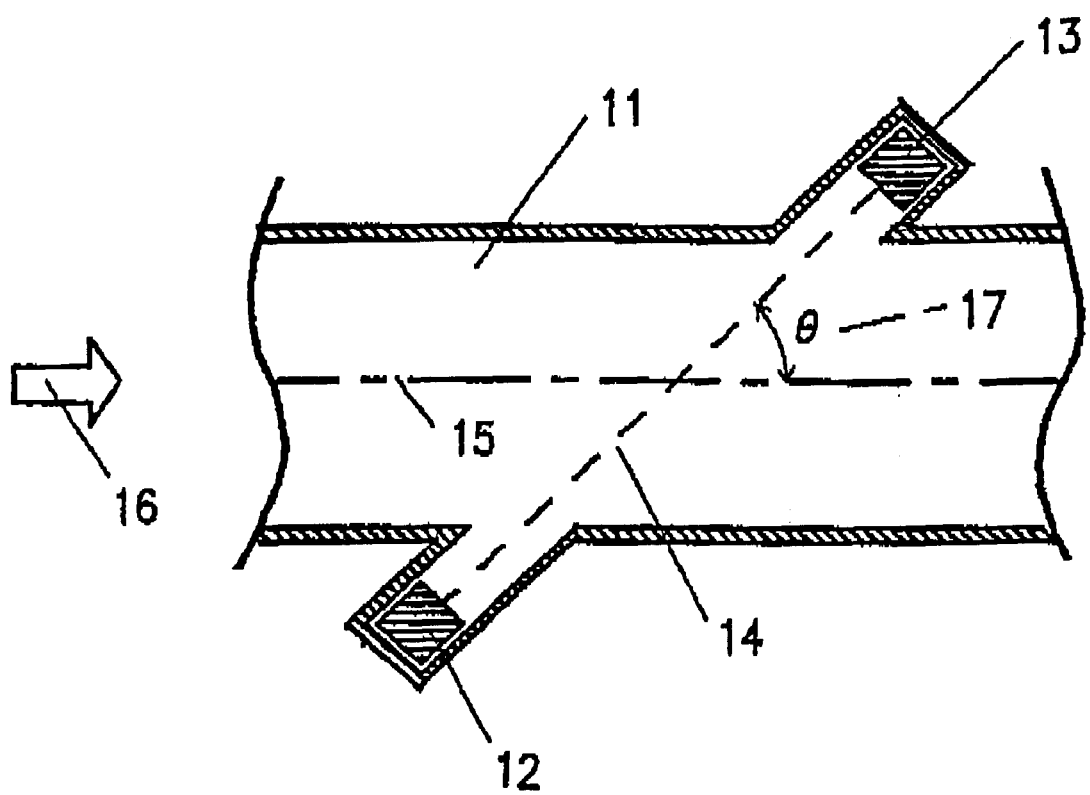
FIG. 3 is a flow velocity measurement section including ultrasonic transceivers according to Embodiment 1 of the present invention.

FIG. 2 shows a flow velocity measurement section which includes a thermal type flow sensor as a flow velocity measurement device. FIG. 3 shows another flow velocity measurement section which includes ultrasonic transceivers as a flow velocity measurement device.

Referring to FIG. 2, a thermal type flow sensor 10 is provided at a point in a fluid pipe 9 as a flow velocity measurement device. The thermal type flow sensor 10 includes a temperature-sensitive resistor and a heater element. An electric power is momentarily provided from an external unit to the heater element. Then, the thermal equilibrium between the heating of the temperature-sensitive resistor by the heater element and the cooling of the temperature-sensitive resistor by the fluid is measured as a resistance value of the temperature-sensitive resistor, and converted to the flow velocity of the fluid. In this case, the flow velocity (Vm) of the fluid measured by the flow velocity measurement device represents the flow velocity of a portion of the fluid in the vicinity of the flow velocity measurement device. If the temperature-sensitive resistor is appropriately calibrated in advance, it is possible to measure the temperature of the fluid from the change in the resistance value.

Referring to FIG. 3, ultrasonic transceivers 12 and 13 as a flow velocity measurement device are provided along a fluid pipe 11 respectively on the upstream side and the downstream side with respect to each other. An ultrasonic wave is transmitted from the upstream ultrasonic transceiver 12 to the downstream ultrasonic transceiver 13, and vice versa, so as to measure the propagation time of the ultrasonic wave for each direction. The flow velocity of the fluid is measured by the difference between the respective propagation times. In FIG. 3, a broken line 14 denotes the propagation direction of the ultrasonic waves, and a one dot chain line 15 and an arrow 16 both denote the direction of the fluid flow. Reference numeral 17 ($\theta$) denotes an angle between the propagation direction of the ultrasonic waves and the direction of the fluid flow. In this case, the ultrasonic transceivers as a flow velocity measurement device measure the flow velocity (Vm) as an average flow velocity of the fluid along the propagation direction 14 of the ultrasonic waves.

The above-described operation can be mathematically expressed as follows:

$$Tud = L/(Vs + Vm \times \cos(\theta)):$$

and $$Tdu = L/(Vs - Vm \times \cos(\theta))$$

where: Tud denotes the time required for an ultrasonic wave transmitted from the upstream ultrasonic transceiver 12 to be received by the downstream ultrasonic transceiver 13; Tdu denotes the time required for an ultrasonic wave transmitted from the downstream ultrasonic transceiver 13 to be received by the upstream ultrasonic transceiver 12; L denotes the distance between the ultrasonic transceivers 12 and 13; Vs denotes the sound velocity; and Vm denotes the flow velocity of the fluid.

Thus, $$Vs + Vm \times \cos(\theta) = L/Tud,$$

and $$Vs - Vm \times \cos(\theta) = L/Tdu.$$

The sum of the two expressions and the difference therebetween are respectively as follows:

$$2 \times Vs = (L/Tud) + (L/Tdu);$$

and $$2 \times Vm \times \cos(\theta) = (L/Tud) - (L/Tdu).$$

Thus, $$Vs = (L/2) \times \{(1/Tud) + (1/Tdu)\};$$

and $$Vm = \{L/(2 \times \cos(\theta))\} \times \{(1/Tud) - (1/Tdu)\}.$$

As can be seen from the above, the sound velocity Vs can be calculated based on the distance L between the ultrasonic transceivers and the sum of the respective inverse numbers of the propagation times Tud and Tdu. The flow velocity Vm can be calculated based on the distance, L between the ultrasonic transceivers and the difference between the respective inverse numbers of the propagation times Tud and Tdu.

Figure 4:
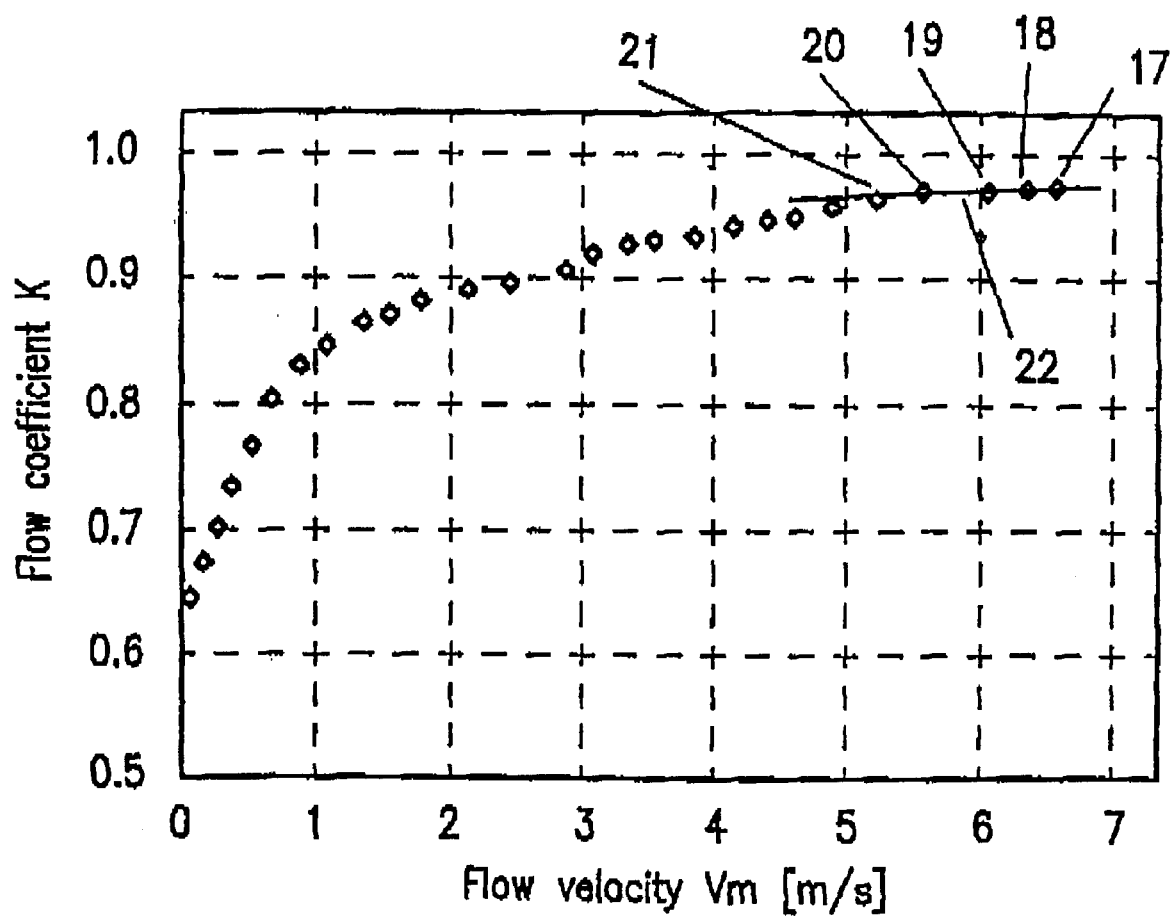
FIG. 4 is a characteristic diagram showing a flow coefficient for illustrating Embodiment 1 of the present invention.

FIG. 4 shows a relationship between the flow velocity (Vm) of the fluid and the flow coefficient (K) measured as described above, for a number of data sets (Vm, K). These sets of data are stored in the reference data memory section 5 and the flow velocity data memory section 6.

FIG. 4 shows the flow velocity (Vm) of the fluid measured by the flow velocity measurement device along the horizontal axis, and the flow coefficient (K) along the vertical axis. As described above, the flow coefficient (K) can be calculated as X=Va/Vm. Herein, the average flow velocity (Va) can be calculated as Va=Qa/S (where, Qa denotes the reference flow rate, and S denotes the cross-sectional area of the fluid pipe), Thus, the reference flow rate (Qa) can be expressed as Qa=S×Va=S×K×Vm.

Next, a method of setting the flow coefficient (K) used in the flow coefficient calculation section 7 according to the present invention will be described. First, any number (e.g., five) of consecutive sets of data (Vm, K) (17, 18, 19, 20 and 21 in FIG. 4) are selected. Then, an optimal approximate straight line 22, which gives the flow rate conversion coefficient (K), is calculated by a method such as a least square method.

The optimal approximate straight line 22 is a straight line which gives a flow coefficient for a flow velocity value (Vm) measured by the flow velocity measurement device. The optimal approximate straight line 22 can be expressed by the following expression:

$$Kc = A \times Vm + B$$

where A and B denote the gradient and the intercept of the line, respectively.

An error of each of the selected five data sets with respect to the optimal approximate straight line 22 is calculated, and it is determined whether the error is within a predetermined range of error Er, e.g., 0.5%. In particular, the measured flow velocity Vm is applied to the optimal approximate straight line 22 (Kc=A×Vm+B) so as to calculate an approximated flow coefficient (Kc). The calculated flow coefficient (Kc) is compared with the measured flow coefficient (K) so as to obtain the error therebetween.

Figure 5:
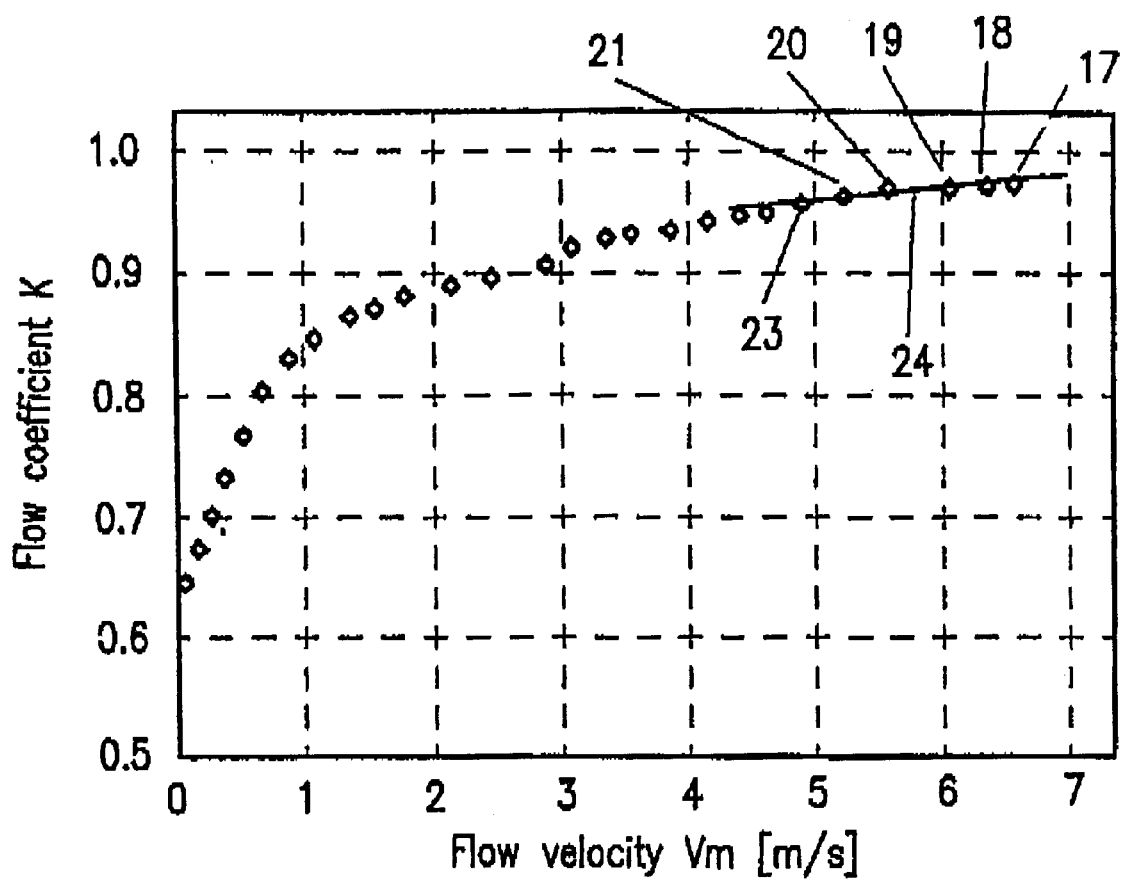
FIG. 5 is a characteristic diagram showing a flow coefficient for illustrating Embodiment 1 of the present invention.

If all of the data sets (the five data sets in this example) are within the error Er (0.5%), a new data set 23 is added thereto, as illustrated in FIG. 5, thereby increasing the number of data sets to six. In the same manner as described above, another optimal approximate straight line 24, which gives the flow coefficient (K), is obtained by a least square method using these six sets of data. It is determined whether all of the six data sets are within the error Er with respect to the optimal approximate straight line 24. In the illustrated example, one of the six data sets (e.g., the data set 20) has an error greater than Er. Thus, in this example, the highest possible number of consecutive data sets within the predetermined error Er is five. Thus, a first region including the five data sets 17, 18, 19, 20 and 21 is set.

Next, starting from the last data set 21 in the first region, any number of data sets (21, 23, 25, 26, . . . ) are selected. Then, as described above, an optimal approximate straight line is calculated by a least square method, and it is determined whether the data sets are within the error Er.

Figure 6:
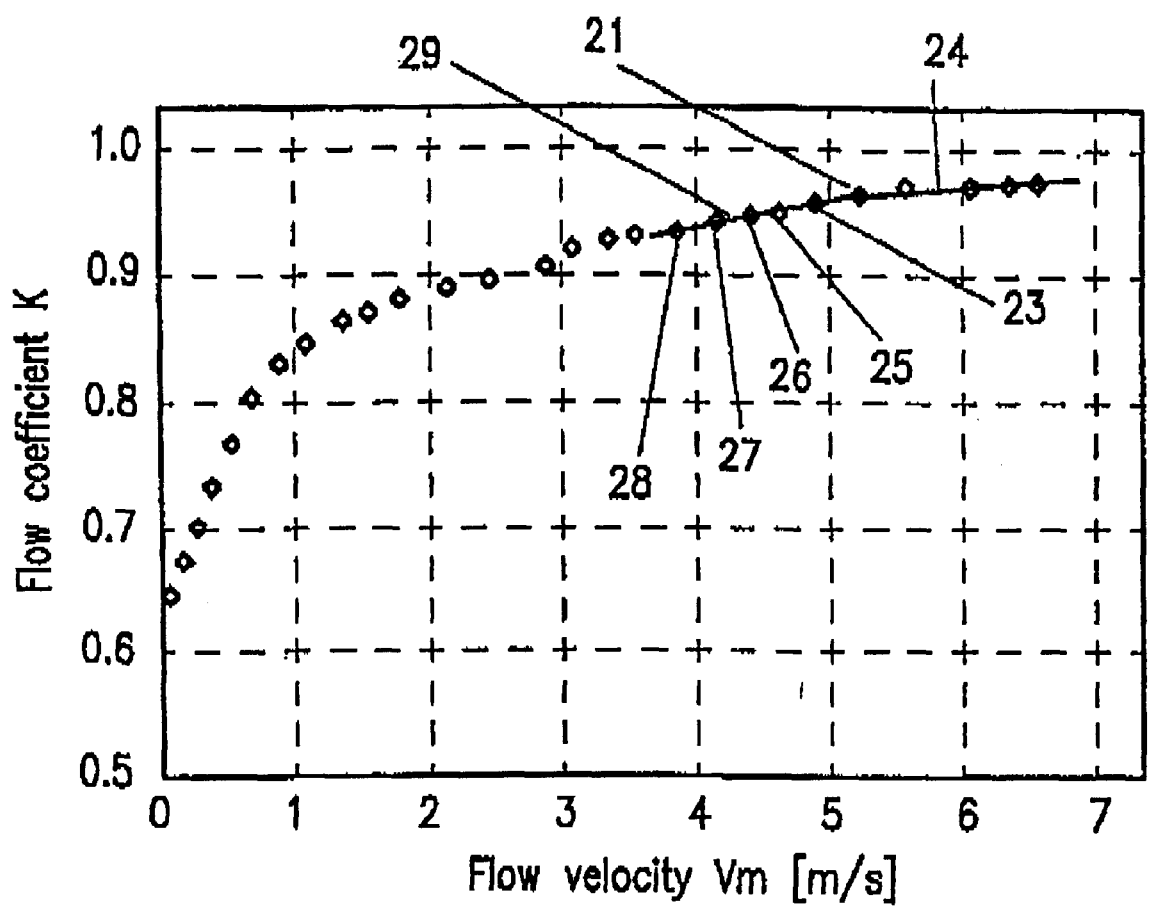
FIG. 6 is a characteristic diagram showing a flow coefficient for illustrating Embodiment 1 of the present invention.

Thus, in the manner as described above, a second region is set which satisfies the error Er. For example, if six, and no mote, data sets 21, 23, 25, 26, 27 and 28 are within the error Er, the second region is determined to include the six data sets, thereby obtaining another optimal approximate straight line 29. This is shown in FIG. 6. In this case, the data set 21 is a boundary point between the two regions. Thereafter, further regions are set in this manner. When the setting operation is complete, a flow coefficient given by the optimal approximate straight line is within the predetermined error Er in each region.

Figure 7:
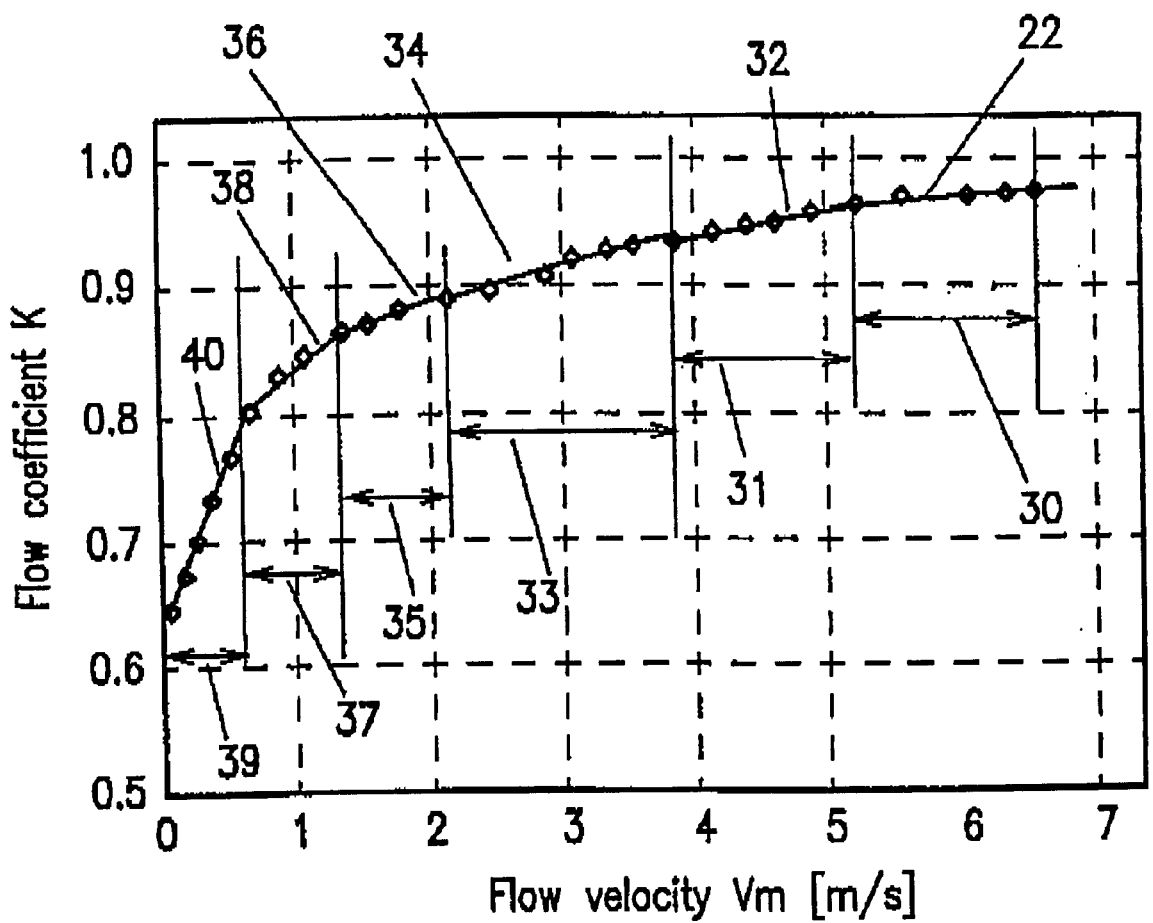
FIG. 7 is a characteristic diagram showing a flow coefficient for illustrating Embodiment 1 of the prevent invention.

FIG. 7 illustrates the obtained optimal approximate straight line including a plurality of regions. The optimal approximate line including a plurality of regions 30–39, which gives the flow coefficient, is stored in the flow coefficient memory section. The first region 30 includes five data sets and the optimal approximate straight line therefor is denoted by reference numeral 22. The second region 31 includes six data sets and the optimal approximate straight line therefor is denoted by reference numeral 32. The third region 33 includes seven data sets and the optimal approximate straight line therefor is denoted by reference numeral 34. The fourth region 35 includes four data sets and the optimal approximate straight line therefor is denoted by reference numeral 36. The fifth region 37 includes four data sets and the optimal approximate straight line therefor is denoted by reference numeral 38. The sixth region 39 includes six data sets and the optimal approximate straight line therefor is denoted by reference numeral 40.

When using the above-described method by applying it to a part of the regions, an upper limit value or a lower limit value can be set, so that the setting operation can be performed in one direction toward the upper limit value or toward the lower limit value from one data set. In such a case, it is possible to perform the setting operation more efficiently and thus to save time.

(Embodiment 2)

Figure 8:
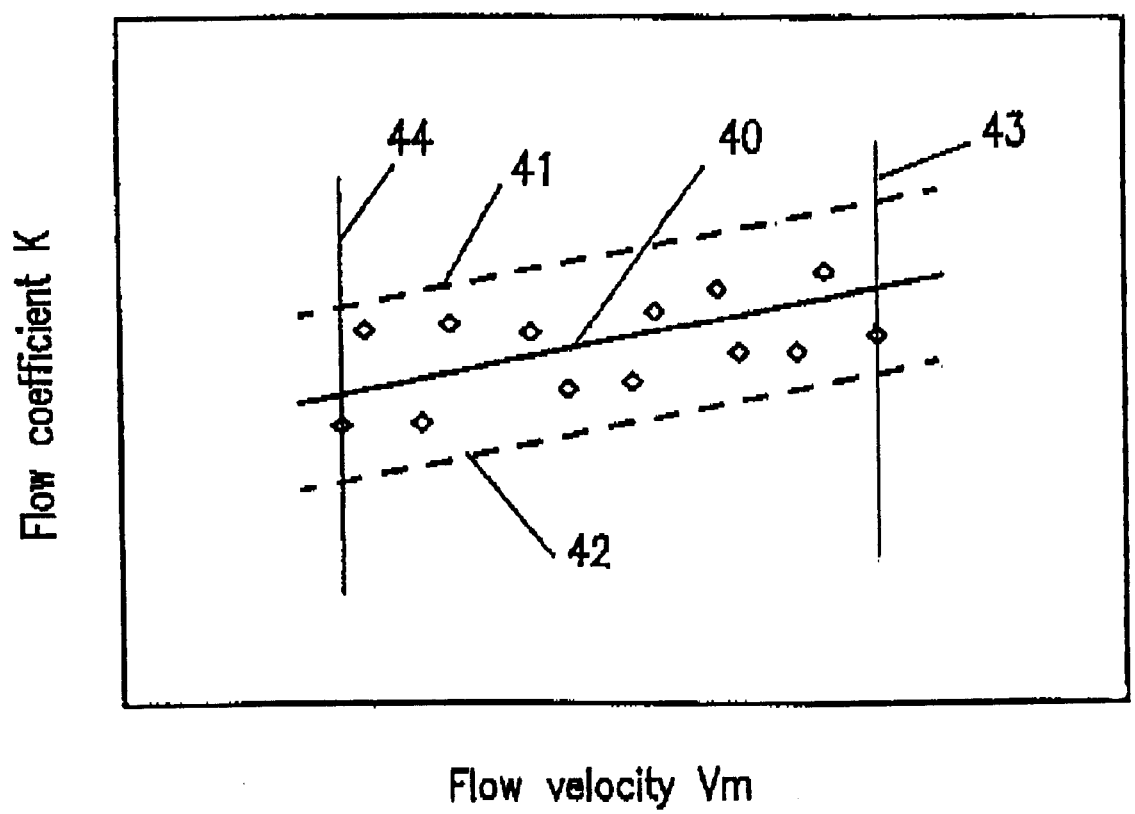
FIG. 8 is a characteristic diagram showing a flow coefficient for illustrating Embodiment 2 of the present invention.

FIG. 8 shows a relationship between the flow velocity (Vm) and the flow coefficient (K) for one region stored in the flow coefficient memory section. In FIG. 8, reference numeral 40 denotes an optimal approximate line, 41 denotes another optimal approximate line 0.5% higher than the optimal approximate line 40, 42 denotes another optimal approximate line 0.5% lower than the optimal approximate line 40, 43 denotes the upper limit of the region, and 44 denotes the lower limit of the region. In this case, the relationship between the measured flow velocity (Vm) and the flow coefficient (K) is distributed within a range of ±0.5% with respect to the optimal approximate line 40 represented by a linear function. Thus, an optimal approximate line represented by a linear function is sufficient for approximating the obtained data points.

(Embodiment 3)

Figure 9:
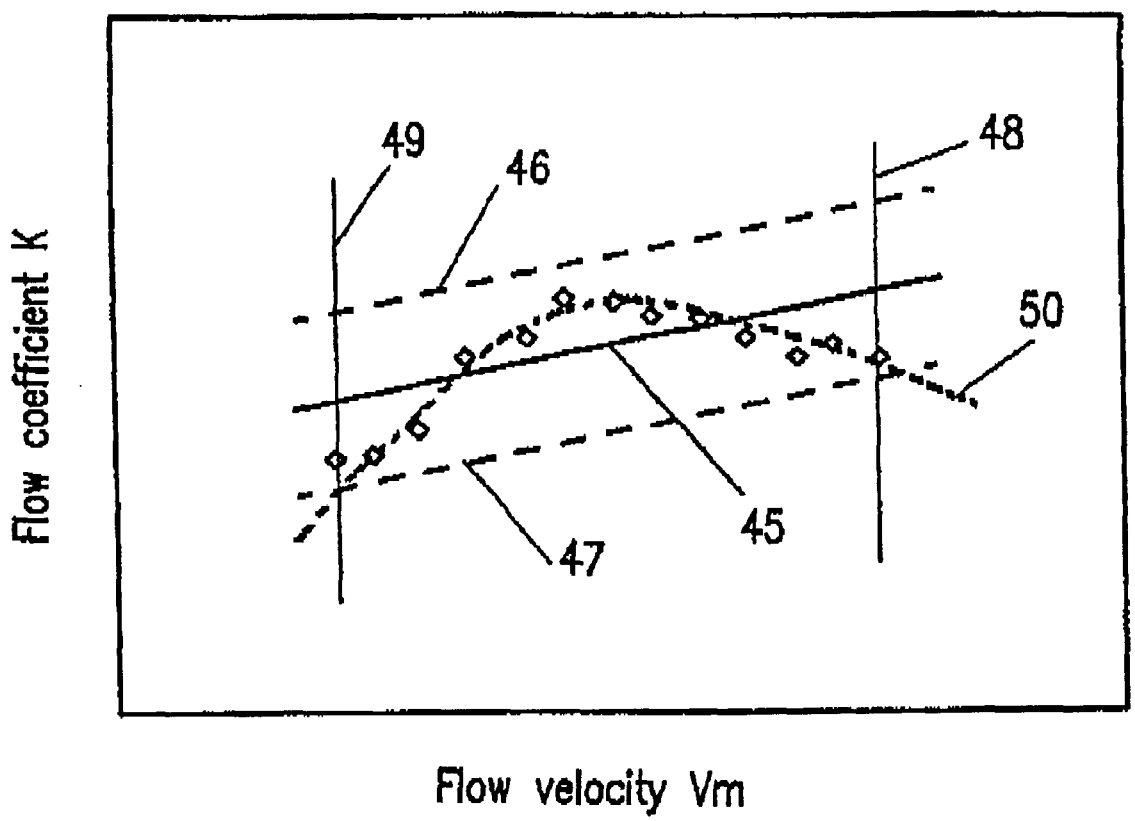
FIG. 9 is a characteristic diagram showing a flow coefficient for illustrating Embodiment 3 of the present invention.

FIG. 9 shows a relationship between the flow velocity (Vm) and the flow coefficient (K) for another region stored in the flow coefficient memory section. In FIG. 9, reference numeral 45 denotes an optimal approximate line, 46 denotes another optimal approximate line 0.5% higher than the optimal approximate line 45, 47 denotes another optimal approximate line 0.5% lower than the optimal approximate line 45, 48 denotes the upper limit of the region, and 49 denotes the lower limit of the region. In this case, the relationship between the measured flow velocity (Vm) and the flow coefficient (K) is distributed in a bell curve-like pattern. In particular, data points in the middle portion of the region represented by a linear function (between 48 and 49), are shifted toward the upper side of the optimal approximate line 45. On the other hand, data points near the upper limit 48 and those near the lower limit 49 are shifted toward the lower side of the optimal approximate line 45. In this case, if an optimal approximate line is represented by a bell-shaped quadric curve 50, the data points are more closely approximated by the optimal approximate quadric curve.

Thus, where the data sets in the middle portion of the region are shifted to one side of the optimal approximate straight line, it is more effective to represent the optimal approximate line by a quadric function rather than a linear function, so that the error can be reduced and/or a greater range can be set as one region, thereby making the setting operation efficient.

(Embodiment 4)

Next, another method of setting a flow coefficient will be described.

Figure 10:
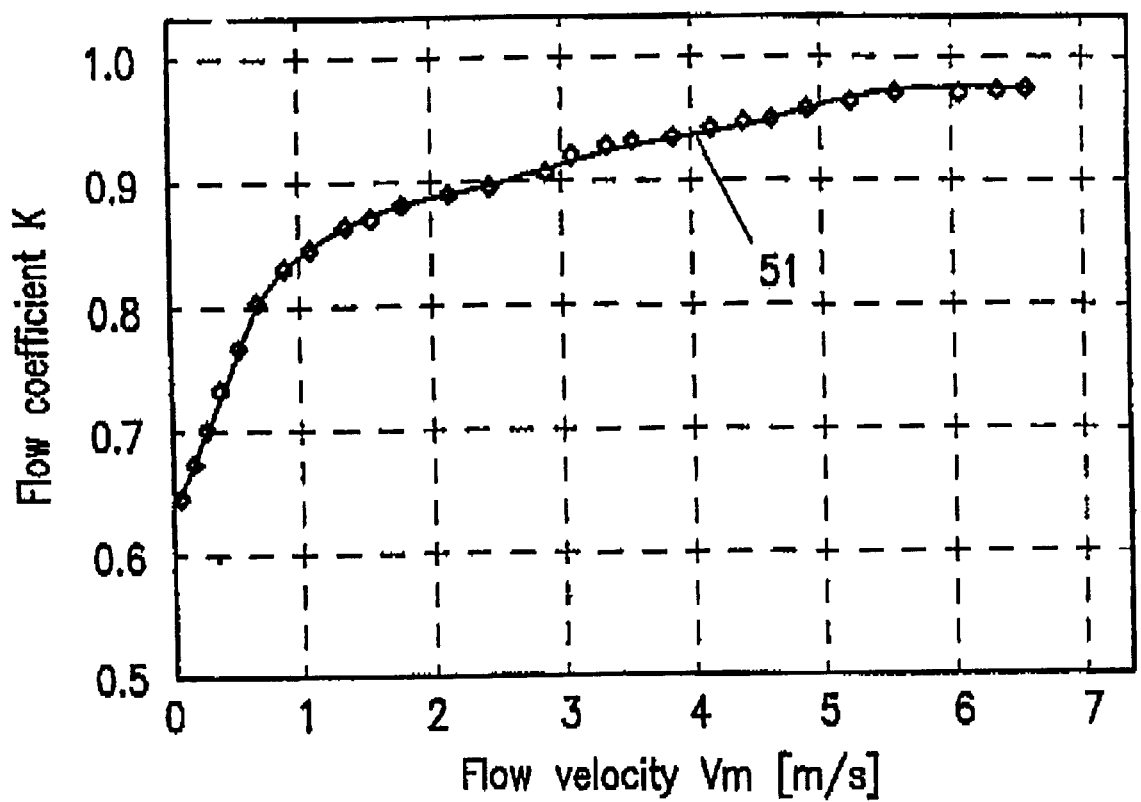
FIG. 10 is a characteristic diagram showing a flow coefficient for illustrating Embodiment 4 of the present invention.

FIG. 10 shows a relationship between the measured flow velocity (Vm) and the flow coefficient (K), for a number of data sets (Vm, K). These sets of data are stored in the reference data memory section 5 and the flow velocity data memory section 6.

First, using all of the data sets (Vm, K) in FIG. 10, the flow coefficient calculation section 7 calculates by a least square method, or the like, an optimal approximate function which gives the flow coefficient K. The optimal approximate function may be, for example, a fifth degree curve: $Y=a_5 \times X^5+a_4 \times X^4+a_3 \times X^3+a_2 \times X^2+a_1 \times X^1+a_0 \times X^0$. The optimal approximate curve is denoted by a solid line 51 in FIG. 10. A predetermined flow velocity range is divided into a predetermined number n of regions. Each region is linearly approximated by using a value along the obtained solid line 51 as a flow coefficient true value. In this way, even at a point between two measured data points, where there in no measured value, the flow coefficient (K) can be calculated from a flow velocity (Vm) using the fifth degree curve 51. Thus, it is possible to more accurately obtain an approximate straight line.

The optimal approximate line calculated as described above is stored in the flow coefficient memory section 8.

As can be seen from the above fifth degree expression, obtaining a fifth degree curve requires only six data points (or six unknowns was, "$a_5$, $a_4$, $a_3$, $a_2$, $a_1$ and $a_0$"). Accordingly, obtaining a quartic curve requires five data points, and obtaining a cubic curve requires four data points. Thus, in the manner as described above, a wide range can be covered with a small number of data points. Moreover, if a tendency is known in advance, the flow coefficient can be set more efficiently by determining the relationship between the flow velocity (Vm) and the flow coefficient (K) according to the degree of the optimal approximate line.

(Embodiment 5)

Figure 11:
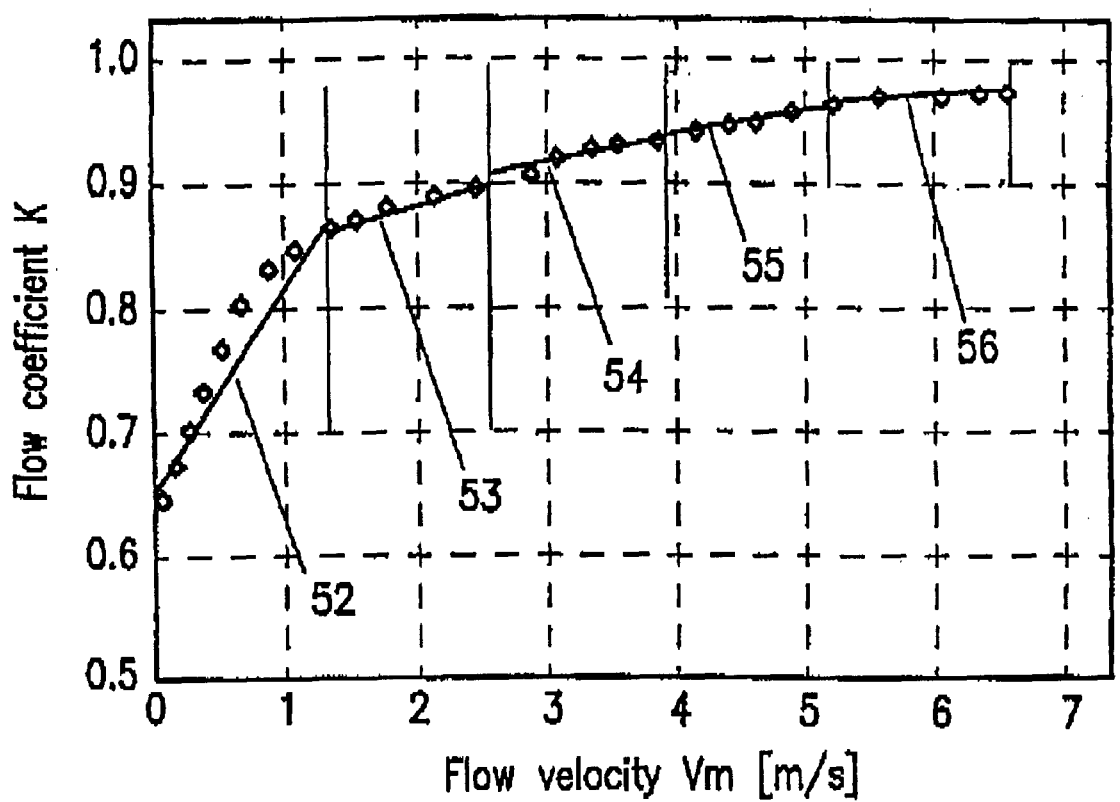
FIG. 11 is a characteristic diagram showing a flow coefficient for illustrating Embodiment 5 of the present invention.

Next, a method of dividing a given flow velocity range into n regions will be described. FIG. 11 shows a case where the flow velocity (Vm) range is divided into five regions. More specifically, the flow velocity (Vm) range is divided into the following five regions: 0–1.3, 1.3–2.6, 2.6–3.9, 3.9–5.2 and 5.2–6.5. For each of the boundary Vm values, the flow coefficient (K) is calculated by using the fifth degree curve 51. The calculated boundary points are linked to one another by straight lines. The straight lines (denoted by five solid lines 52, 53, 54, 55 and 56, respectively, in FIG. 11) are used as flow coefficient approximate straight lines. For the solid line 52, for example, the data sets at the opposite ends thereof are calculated from the fifth degree curve 51 shown in FIG. 10, thereby obtaining two data sets (Vm, K): (0, 0.65) and (1.3, 0.87). Then, the flow coefficient (K) can be expressed by the following expression: $K=0.16 \times Vm+0.65$.

As described above, even a point where there is no measured data can easily be calculated. Thus, an approximate straight line can easily be set.

(Embodiment 6)

Figure 12:
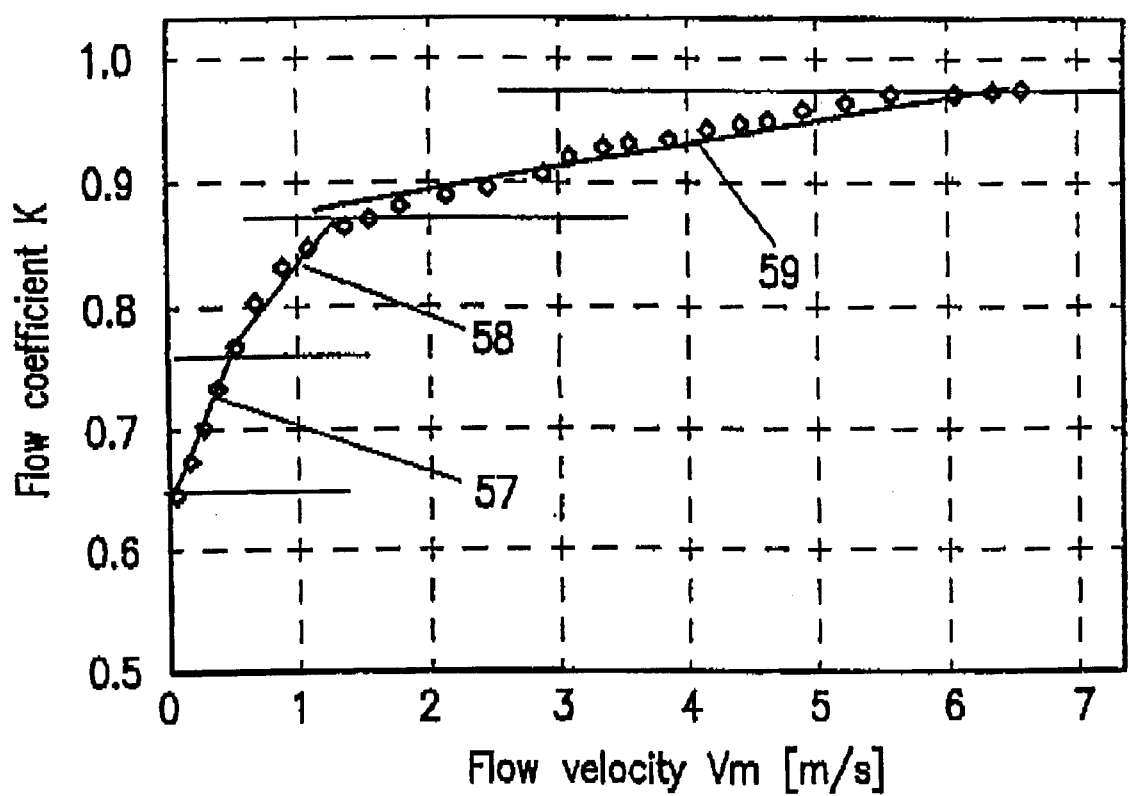
FIG. 12 is a characteristic diagram showing a flow coefficient for illustrating Embodiment 6 of the present invention.

Next, another n-division method will be described. FIG. 12 shows a case where the flow coefficient (K) range is divided into three regions. More specifically, the flow coefficient (K) range to divided into the following three regions: 0.65–0.77, 0.77–0.88 and 0.88–0.95. For each of the boundary flow coefficients (K), a data set corresponding to the boundary point is calculated. The calculated data points are linked to one another by straight lines. The straight lines (denoted by three solid lines 57, 58 and 59, respectively, in FIG. 12) are used as flow coefficient approximate straight lines for the respective regions.

As in Embodiment 5, even a point where there is no measured data can easily be calculated. Thus, an approximate straight line can easily be set. The set approximate straight lines for calculating the flow coefficient (K) are stored in the flow coefficient memory section.

In the setting method of Embodiment 5, an upper limit value or a lower limit value is preferably provided for the flow velocity (Vm) (or for the flow coefficient (K) for Embodiment 6), so that the setting operation can be performed more efficiently. In this way, the setting operation can be performed more efficiently within a shorter period of time, particularly when applying the present invention to a flow meter, or the like, where the required range, the flow velocity range or the flow coefficient range is often prescribed.

(Embodiment 7)

Figure 13:
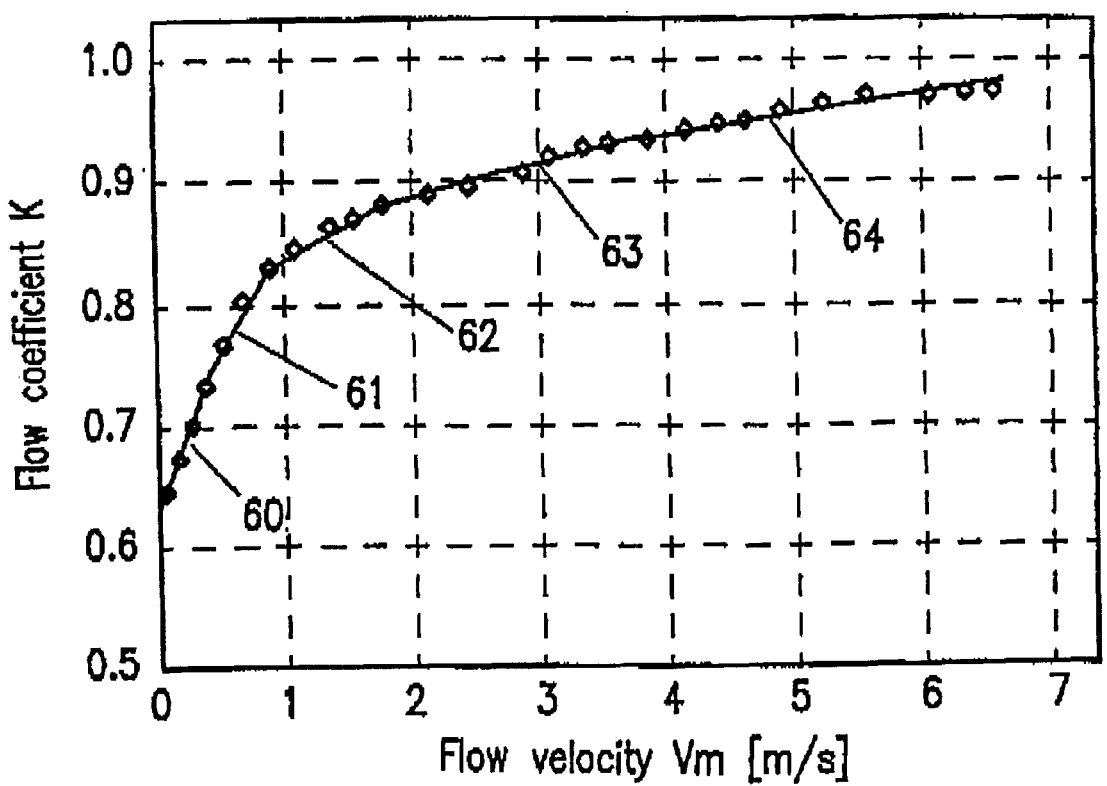
FIG. 13 is a characteristic diagram showing a flow coefficient for illustrating Embodiment 7 of the present invention.

Next, still another n-division method will be described. In this Embodiment, the width of each region (the width along the x axis) is set to be inversely proportional to the gradient of the approximate line so as to improve the proximity to the flow coefficient (K). In this way, the width along the x axis is smaller for a region where the gradient is larger, and the width along the x axis is larger for a region where the gradient is smaller. As a result, the proximity of the approximate straight line which depends upon the gradient becomes more uniform across all regions. FIG. 13 shows a case where a data range is divided into five regions in such a manner. More specifically, the data range is divided into the following five regions: 0.65–0.73, 0.73–0.83, 0.83–0.88, 0.88–0.93 and 0.93–0.98 in terms of the flow coefficient (K). In the figure, the respective approximate straight lines are denoted by five solid lines 60, 61, 62, 63 and 64. As described above, even for a point where there is no measured data, a data set corresponding to a boundary value can easily be calculated using, the fifth-degree curve. Thus, an approximate straight line can easily be set. The set approximate straight lines for calculating the flow coefficient (K) are stored in the flow coefficient memory section.

(Embodiment 8)

Figure 14:
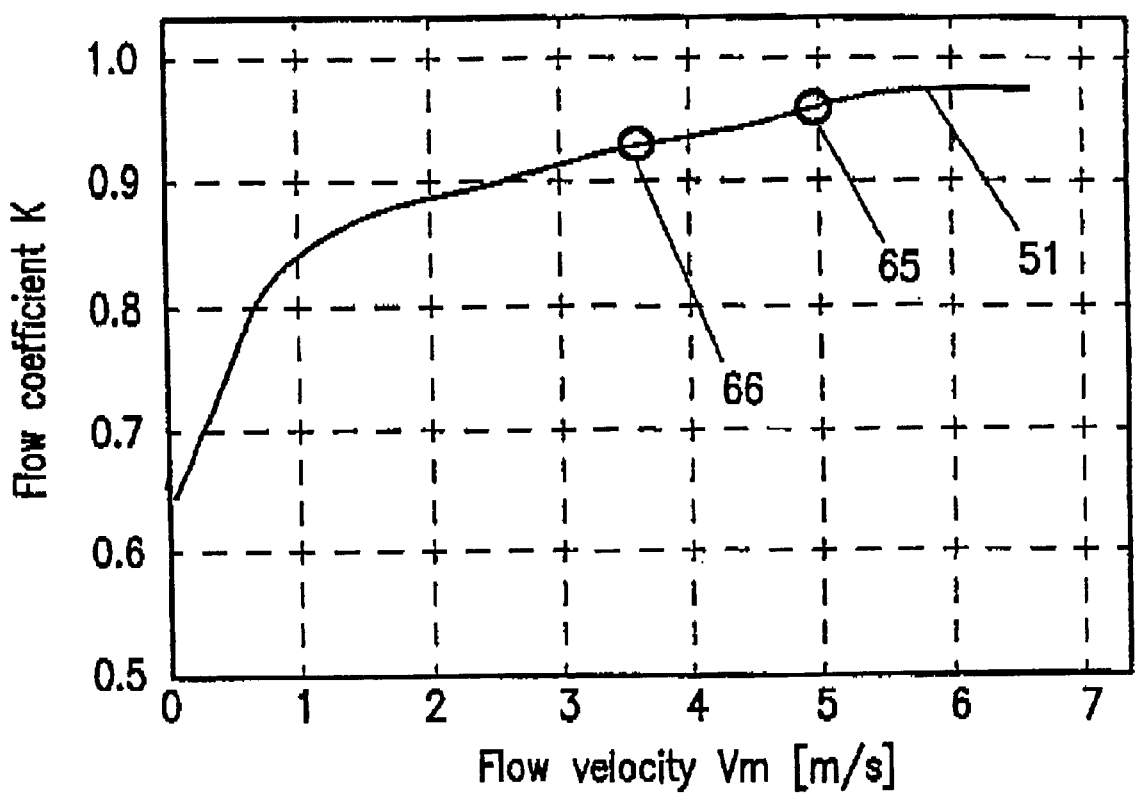
FIG. 14 is a characteristic diagram showing a flow is coefficient for illustrating Embodiment 8 of the present invention.

Next, referring to FIG. 14, a further n-division method will be described in which the proximity to the flow coefficient is further improved so an to better suppress the error within the predetermined error Er. FIG. 14 shows a fifth degree curve 51 obtained by measured data sets (Vm, K). More particularly, FIG. 14 shows a case where the setting operation starts from an upper limit value 65 (indicated by the symbol "○"), using the fifth degree curve 51 as a flow coefficient true value with the error Er being predetermined to be 2%, for example. Any point, e.g., a point 66 (also indicated by the symbol "○"), is selected along the fifth degree curve 51 at a flow velocity (Vm) smaller than that at the point 65. Referring to an enlarged view shown in FIG.

15, the points 65 and 66 are linked to each other by a straight line (indicated by a broken line 67). The straight line 67 is assumed to be an approximate straight line which gives the flow coefficient (K). Since the straight line 67 passes through the two points 65 and 66 along the fifth degree curve 51, the coordinates (Vm, K) of the two points 65 and 66 can easily be calculated using the fifth degree expression shown above. Accordingly, the expression which represents the straight line 67 passing through the two points 65 and 66 can also be calculated easily.

Figure 15:
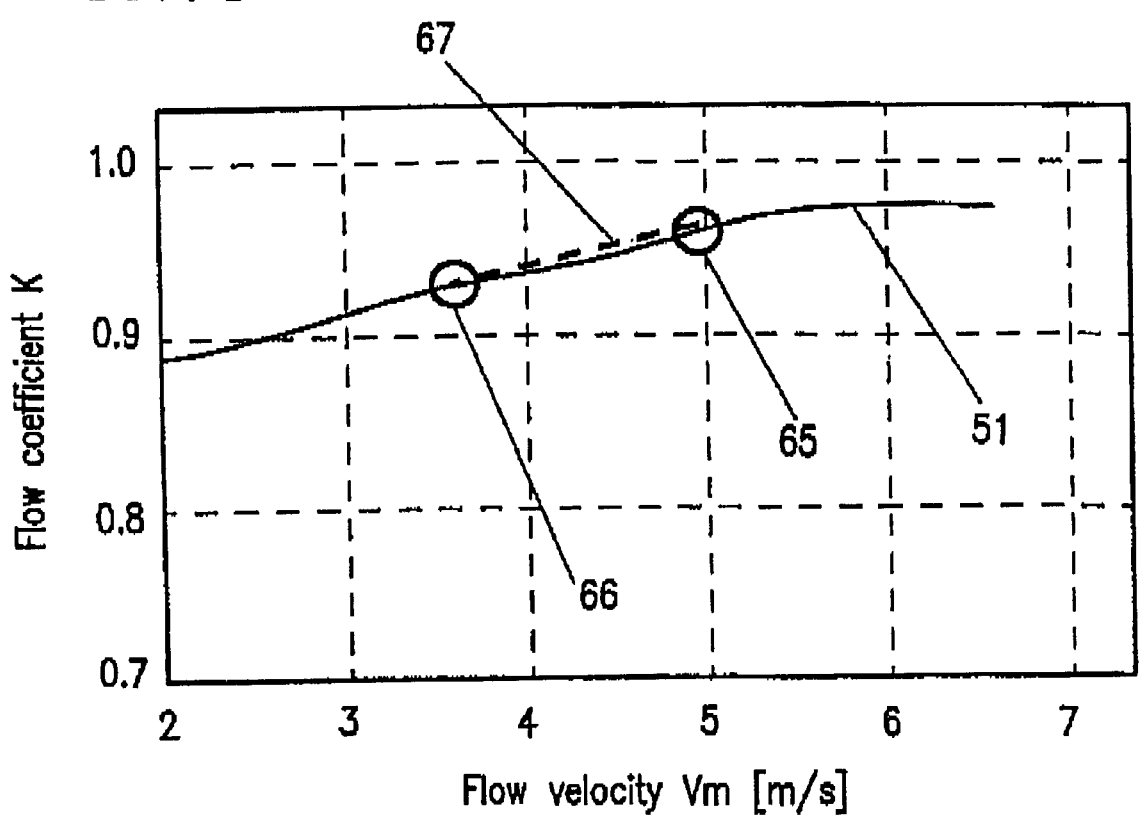
FIG. 15 is a characteristic diagram showing a flow coefficient for illustrating Embodiment 8 of the present invention.

Then, for a selected flow velocity Vm between the points 65 and 66, the flow coefficient (K) is calculated. In particular, the true value of the flow coefficient (K) is calculated using the fifth degree curve 51. Moreover, for the flow velocity Vm, an approximate value (Kc) of the flow coefficient is also calculated using the straight line 67. The calculated approximate value (Kc) is compared with the true value (K) so as to calculate the error therebetween. If the error is within the predetermined error Er (2%), the point 66 is slightly moved to a smaller flow velocity (Vm) (i.e., to the left in FIG. 15), and the above-described operation is repeated. If the calculated error is greater than the predetermined error Er (2%), the point 66 is slightly moved to a larger flow velocity (Vm) (i.e., to the right in FIG. 25), and the above-described operation is repeated. The amount by which the point 66 is moved each time is dependent upon the required precision. In the present Embodiment, the amount is set to 0.001.

Figure 16:
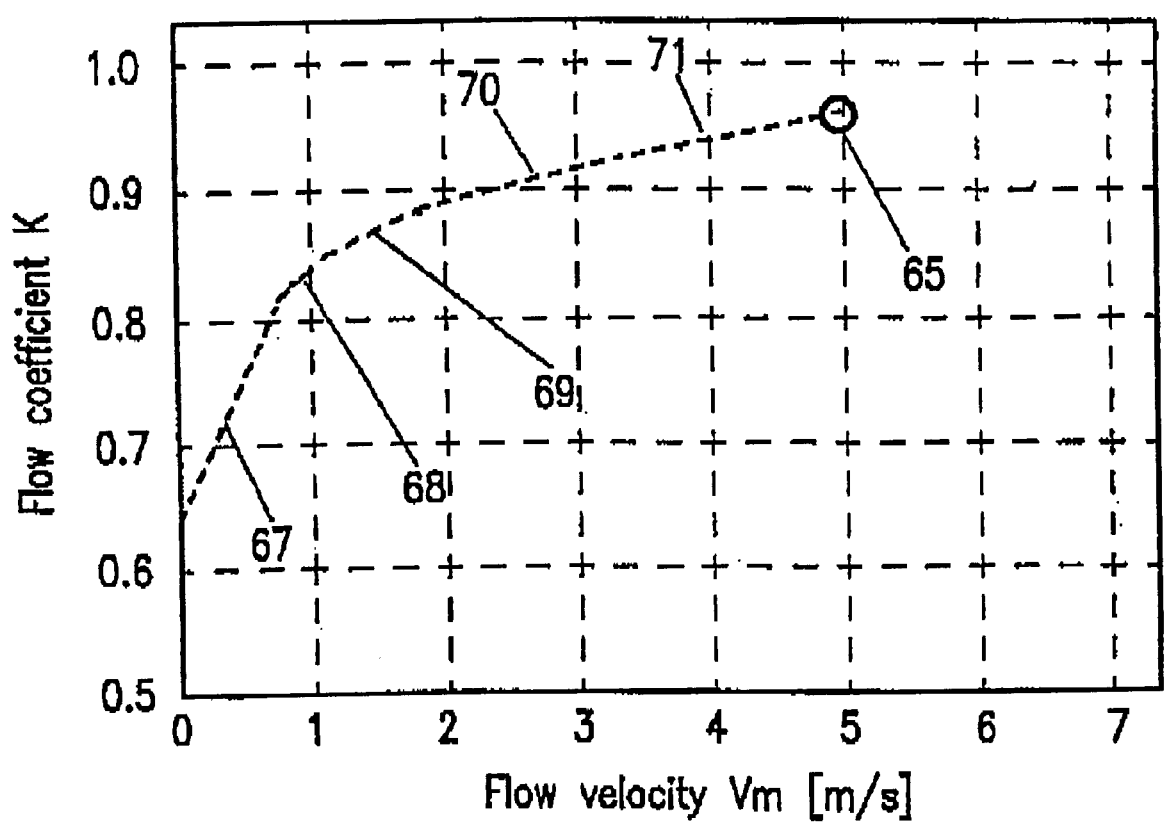
FIG. 16 is a characteristic diagram showing a flow coefficient for illustrating Embodiment 8 of the present invention.

FIG. 16 shows the results of the operation as described above Referring to FIG. 16, five approximate straight lines (indicated by broken lines 67, 68, 69, 70 and 71) are set starting from the upper limit value 65 (indicated by the symbol "○"), wherein the error is within the error Er (2% for each of the approximate straight lines. Thus, the predetermined flow velocity (Vm) range is divided into five regions. The obtained results show that any point along the fifth degree curve 51 has an error within 2% as calculated using these approximate straight lines. The set approximate straight lines for calculating the flow coefficient (K) are stored in the flow coefficient memory section.

(Embodiment 9)

Still another n-division method will be described, which is similar to Embodiment 8 but is more suitable where the maximum number of regions, i.e., the maximum number of approximate straight lines, is limited. For example, the maximum number of approximate straight lines (regions) is assumed to be three. The setting operation as shown in Embodiment 8 is performed with the error Er being predetermined to be 2%, thereby resulting in five approximate straight lines (regions). Since this is over the maximum number of regions available (i.e., three), the predetermined error Er is gradually increased, e.g., to 2.5%, 3.0%, and so forth, and the setting operation as shown in Embodiment 8 is repeated. In this manner, three approximate straight lines (regions) with an optimal error distribution across all regions can be obtained.

When the maximum number of approximate straight lines is as large as ten, on the other hand, the predetermined error Er can be gradually decreased, e.g., to 1.5%, 0.5%, and so forth, thereby obtaining ten approximate straight lines (regions) with an optimal error distribution across all regions. For the data shown in FIGS. 14 to 16, the number of approximate straight lines is nine with the error Er being 0.5%. In this way, an optimal error distribution can be obtained for any particular number of approximate straight lines. The set approximate straight lines for calculating the flow coefficient (K) are stored in the flow coefficient memory section.

(Embodiment 10)

Next, a function form other than the fifth degree curve which can be used as a true value of the flow coefficient (K) will be described. It has been found that with the arrangement of the flow velocity measurement section as illustrated in FIGS. 2 and 3, the following function form exhibits a higher proximity than a fifth degree function.

$$Y = a \times \mathrm{Log}(X) + b$$

where X denotes the flow velocity (Vm), and Y denotes the flow coefficient (K).

Figure 17:
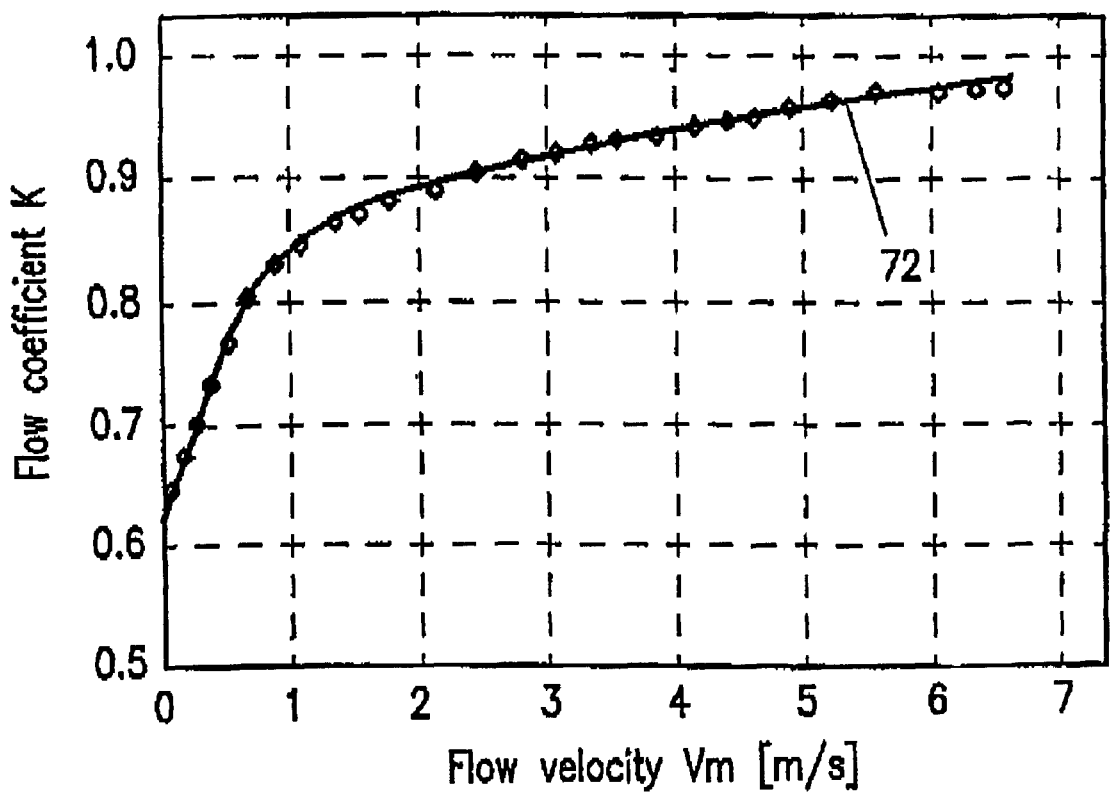
FIG. 17 is a characteristic diagram showing a flow coefficient for illustrating Embodiment 9 of the present invention.

FIG. 17 shows a solid line 72 obtained by the above expression where a=0.067 and b=0.299. It can be seen from FIG. 17 that the solid line 72 is a good approximate curve in the wide range of flow velocity (Vm) from 0.2 to 6.0. In this case, since there are only two unknowns (a and b), the above expression can be calculated only with two measured data points so as to calculate an approximate curve over a wide range. Thus, it is also possible to calculate an approximate straight line by calculating the above expression from two data sets (Vm, K) and using the calculated value as a flow coefficient true value. Thus, the operation efficiency is considerably improved. In Embodiment 10, the above-described function form is applied to all of the regions. Alternatively, the setting operation can efficiently be performed by partially applying it to some of the regions.

(Embodiment 11)

Figure 18:
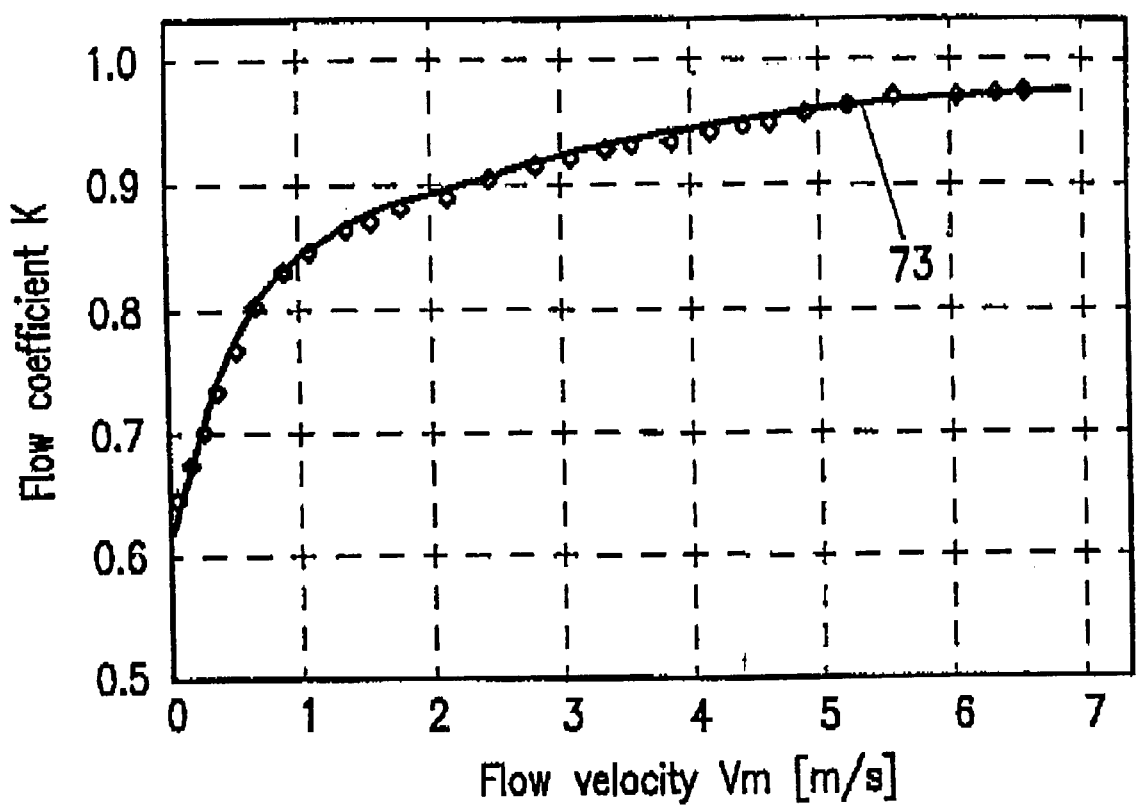
FIG. 18 is a characteristic diagram showing a flow coefficient for illustrating Embodiment 10 of the present invention.

Next, still another function form will be described. It has been found that with the arrangement of the flow velocity measurement section as illustrated in FIGS. 2 and 3, if a rectification section is provided along the pipe upstream of the flow velocity measurement section, the flow coefficient (K) tends to approach a constant value in a low flow velocity region and in a high flow velocity region. In such a case, the function form represented by the following expression exhibits a higher proximity than that described in Embodiment 10.

$$Y = (a-b)/[1 + \exp(-cX)] + b$$

where X denotes the flow velocity (Vm), Y denotes the flow coefficient (K), and a, b and c are unknowns, Herein, the unknown b denotes a constant value in the low flow velocity region, i.e., a lower limit value of the flow coefficient. The unknown a denotes a constant value in the high flow velocity region, i.e., an upper limit value of the flow coefficient. FIG. 18 shows the measured flow coefficient values measured with the rectification section provided on the upstream side, and the calculation result of the above expression where a=0.920, b=0.385 and c=1.50. In FIG. 18, each symbol "◇" represents a measured value, and a solid line 73 is a curve obtained based on the above expression. It can be seen that the above function including the three unknowns a, b and c exhibits a good proximity over a very wide range. The above expression can be calculated with as few as three data sets (Vm, K). Using the obtained value as a true value of the flow coefficient (K), it is possible to easily set an approximate straight line to the flow coefficient (K) without having to measure many data points.

Again, the set approximate straight lines for calculating the flow coefficient (K) are stored in the flow coefficient memory section. It has also been confirmed that where the flow coefficient (K) exhibits an upward slant to the right in the high flow velocity region (i.e., where the flow coefficient (K) increases in proportion to the flow velocity), the constant a in the above function form can be substituted with d×X+e to obtain a good proximity to the measured values. In such a case, however, there is one additional unknown d. In Embodiment 11, the above-described function form is applied to all of the regions. Alternatively, the setting operation can efficiently be performed by partially applying it to some of the regions.

(Embodiment 12)

Next, how to handle a boundary point between two adjacent regions will be discussed. The flow coefficients and the regions are set while using successive data sets. As a result, a data set corresponding to the boundary between two regions belongs to both of the regions. If the flow velocity of the fluid measured by the flow velocity measurement section coincides with a boundary flow velocity value, it is necessary to determine whether the flow coefficient of one region or that of the other region is to be used for the measured flow velocity. According to Embodiment 12, a boundary value between two adjacent regions is net so that it belongs to one of the regions that gives a flow coefficient with a smaller error. As a result, it is possible to reduce the error for a boundary value.

(Embodiment 13)

Next, a method of setting a boundary value will be described. An intersection between two low-degree optimal approximate lines which are set for two adjacent regions is used as the boundary value therebetween.

This method reduces a gap which may occur between two adjacent optimal approximate lines, thereby more smoothly connecting the optimal approximate lines with one another. Moreover, with this method, it is possible to uniquely determine the boundary between two adjacent regions, and to realize at one-to-one correspondence between the measured flow velocity (Vm) and the flow coefficient (K).

(Embodiment 14)

Another method of setting a flow coefficient suitable when a type of a fluid whose flow rate is to be measured changes after setting a flow coefficient (K). For example, assume a case where the flow coefficient (K) of air is first measured, thereby obtaining measured values (each denoted by the symbol "◇" in FIG. 18) and setting a flow coefficient (represented by the solid line 73 in FIG. 18), after which the measured fluid is changed to nitrogen, methane, propane, etc. Referring to FIG. 18, for example, the change in the flow coefficient (K) for air for the flow velocity range of 0–7 m/s is about 0.65 to about 0.98. The mid value between the flow coefficient values 0.65 and 0.98 is about K=0.80. Then, the flow velocity of the new fluid for K=0.80 is measured by a flow velocity measurement device, so as to calculate the flow velocity ratio Rv therebetween by the following expression:

$$Rv=Vm(\text{Gas}, 0.80)/Vm(\text{Air}, 0.80)$$

where Vm(Gas, 0.80) denotes the flow velocity of the new fluid for K=0.80, and Vm(Air, 0.80) denotes the flow velocity of air measured for K=0.80.

Figure 19:
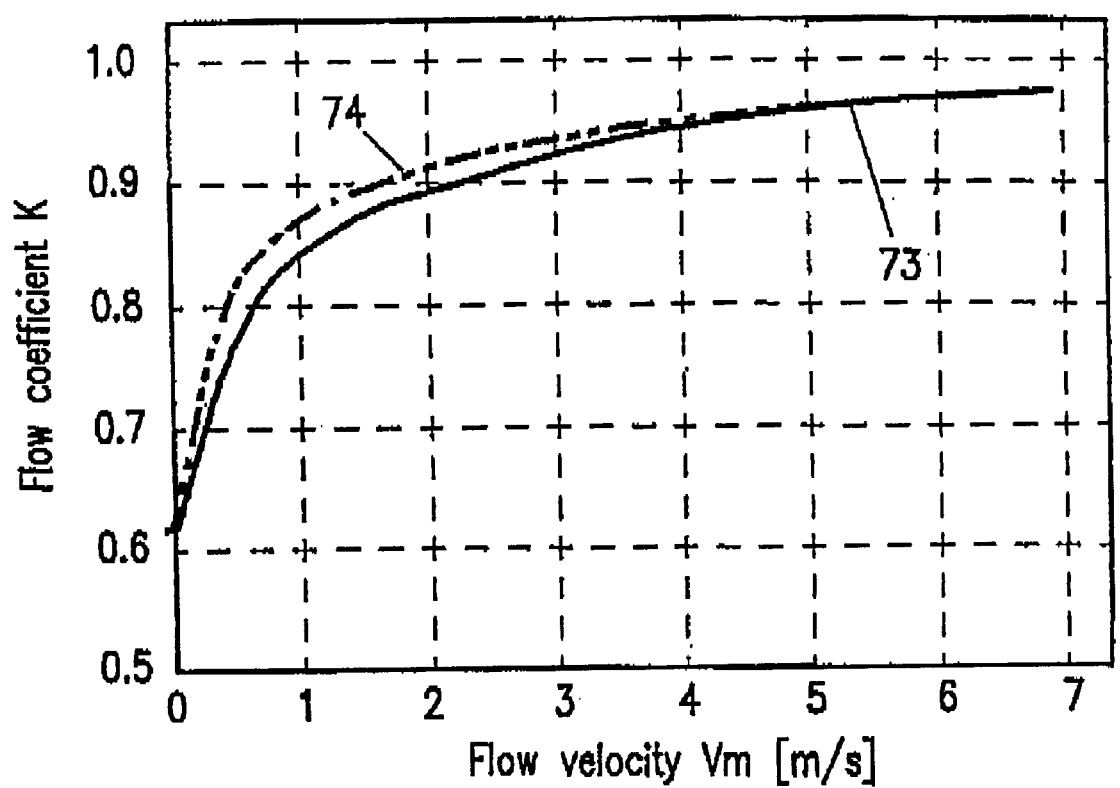
FIG. 19 is a characteristic diagram showing a flow coefficient for illustrating Embodiment 11 of the present invention.

Then, the measured flow velocity Vm(Air), which can be obtained from FIG. 18, is multiplied by the flow velocity ratio Rv so as to obtain a new flow velocity. FIG. 19 shows the results by a two dot chain line 74. In the illustrated example, the flow velocity ratio Rv is about 2 to about 3. The two dot chain line 74 obtained as described above denotes the converted flow coefficient (K) for the new fluid (Gas). The solid line 73 in FIG. 19 denotes the flow coefficient (K) for air.

In this manner, the flow coefficient (K) can easily be re-calculated even when the measured fluid changes. Thus, it is possible to easily obtain the flow coefficient for a new fluid (Gas) without having to newly measure the flow coefficient (K) for the new fluid (Gas). In other words, it is possible to obtain a flow coefficient for a different fluid by changing (re-scaling, in this case) the flow velocity (Vm) according to the type of the fluid. As described above, any change in the measured fluid can be accommodated simply by multiplying a constant, which depends upon the type of the fluid (i.e., the flow velocity ratio Rv) to the horizontal axis value (Vm) of the flow coefficient (K) graph.

(Embodiment 15)

A method of setting a flow coefficient for a fluid suitable when the temperature of the fluid, whose flow rate is to be measured, changes after setting the flow coefficient (K) for a certain fluid at a certain temperature will be described below. When the temperature of a fluid changes, the characteristics of the fluid may also change, thereby causing an error in the measured flow rate value. The method of Embodiment 15 can provide a flow rate value with a reduced error even when the temperature of the fluid changes.

For example, assume that the flow coefficient (K) as shown in FIG. 18 is first set at a temperature Ts (e.g., 20° C., 293.15 K, reference temperature). When the temperature of the fluid changes (e.g., due to a change in the ambient temperature) to a new temperature Ti before the flow rate of the fluid is measured, some error may occur if the predetermined flow coefficient (K) is used with the new temperature. It has been experimentally confirmed that it is possible to suppress the error to a level which is practically not problematic (e.g., about 1.5% or less), as follows. First, the flow velocity Vi is measured at the new temperature Ti. Then, the flow velocity Vi is converted to a new flow velocity $Vi_2$ by the following expression:

$$Vi_2=Vi(Ts/Ti)^p$$

where Ts denotes the temperature of the fluid when setting the flow coefficient (K), Ti denotes the temperature of the fluid when measuring the flow rate of the fluid, Vi denotes the flow velocity of the fluid measured at the new temperature Ti, and p denotes an exponent to be described below. Herein, the temperatures Ts and Ti are both absolute-temperatures [K].

Then, a flow coefficient Ki at the new temperature Ti obtained from FIG. 18 as a flow coefficient value for the converted flow velocity $Vi_2$. Finally, the flow rate of the fluid is calculated based on the obtained flow coefficient Ki.

Regarding the exponent p, it has been confirmed that the exponent p should preferably be about 1.5 to about 3.0, and more preferably about 2.5, the value which exhibited the best conformity to the experimental values.

For example, assume a case where a flow coefficient (K) is met when the temperature Ts of the fluid is 20° C. (293 K), after which the flow velocity Vi of the same fluid is measured to be 2 m/s when the temperature Ti of the fluid is 0° C. (273 K). At 20° C.; the flow coefficient (K) for the flow velocity of 2 m/s can be read from FIG. 12 to be about 0.89. However, the flow coefficient (K) should instead be obtained as follows since the temperature has changed to 0° C. First, by using the above expression, the measured flow velocity Vi is converted to $Vi_2$ as follows:

$$Vi_2=2\cdot(293/273)^{2.5}=2.38 \text{ m/s.}$$

Then, the flow coefficient (Ki) for the fluid temperature of 0° C. can be read from FIG. 18 to be about 0.91 (corresponding to Vm=2.38 m/sec).

Thus, even when the temperature of the fluid changes, the flow coefficient value for the new temperature can be obtained by converting the solid line 73 in FIG. 18, i.e., the flow coefficient for the first temperature (20° C.), to another flow coefficient for the now temperature, thereby eliminating the need to newly measure the flow coefficient for the new temperature and thus making the setting operation very efficient. In other words, since the approximate straight line to the flow coefficient is set while using an optimal function, it is possible, even when the temperature of the fluid changes, to calculate a new flow coefficient for the new temperature by a simple coordinate conversion, i.e., by multiplying a temperature-dependent function value (e.g., the temperature ratio as in this case) to the x-axis value (flow velocity).

To measure the temperature of the fluid, a temperature sensor may be separately provided in the fluid pipe. However, it may not be necessary according to the present invention. For example, when the flow velocity of the fluid is measured by a thermal type flow sensor, since a thermal type flow sensor includes a temperature-sensitive resistor, the temperature of the fluid can easily be obtained by measuring the resistance value thereof.

Also when the flow velocity of the fluid is measured by a pair of ultrasonic transceivers which are provided along the fluid pipe respectively on the upstream side and the downstream side with respect to each other), it is not necessary to separately provide a temperature sensor for the following reason.

The distance L between the upstream ultrasonic transceiver and the downstream ultrasonic transceiver is constant and known. Therefore, based on the average propagation time between the ultrasonic transceivers (i.e., the sum of the inverse number of the propagation time from the upstream side to the downstream side and the inverse number of the propagation time from the downstream side to the upstream side), the sound velocity Vs through the measured fluid can be obtained by the following expression:

$$Vs=(L/2)\times\{(1/Tud)+(1/Tdu)\}.$$

As can be seen, the sound velocity expression contains no term for the flow velocity of the fluid. This means that the sound velocity Vs through the measured fluid can be known independently of the flow velocity of the fluid.

Since the velocity of sound propagating through a fluid is strongly dependent upon the temperature of the fluid, it is possible to obtain the temperature of the fluid based on the sound velocity. As is commonly known, the sound velocity through air V(Air) m/s can be expressed as follows by a linear function:

$$V(Air)=331.5+0.6\times t,$$

or $$V(Air)=331.5+0.6\times(Tabs-273.15)$$

where t denotes a temperature in Celsius (°C.), and Tabs denotes an absolute temperature (K).

Since the temperature t of the fluid can easily be obtained from the sound velocity V(Air), as described above, it is not necessary in the present invention to separately provide the temperature sensor for measuring the temperature of the fluid.

In Embodiment 15 described above, the temperature ratio of the fluid (in absolute temperature) is used when converting the flow coefficient to accommodate a change in the temperature of the fluid. However, a sound velocity ratio of the fluid may alternatively be used instead of the temperature ratio because the temperature of a fluid and the sound velocity through the fluid are strongly correlated with each other, as described above. In such a case, however, the exponent p may be slightly different from that shown above.

(Embodiment 16)

Figure 20:
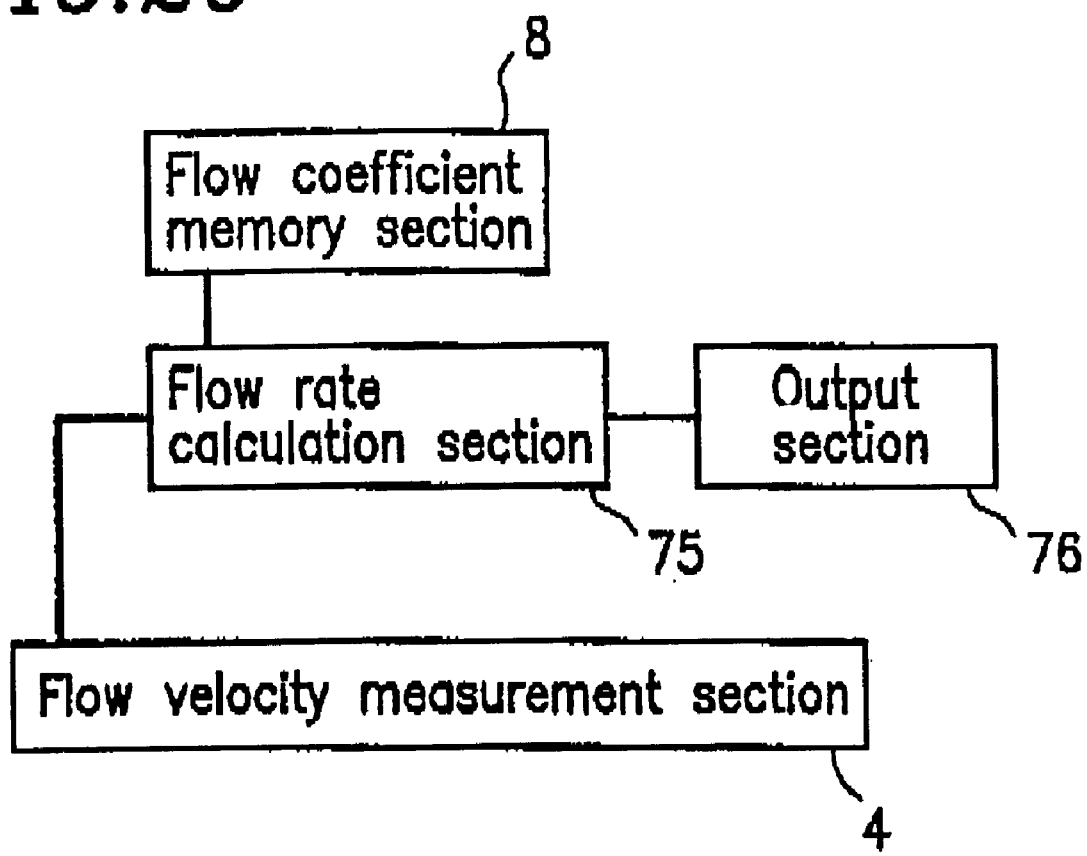
FIG. 20 is a diagram showing a structure of a flow meter for illustrating Embodiment 16 of the present invention.
Figure 21:
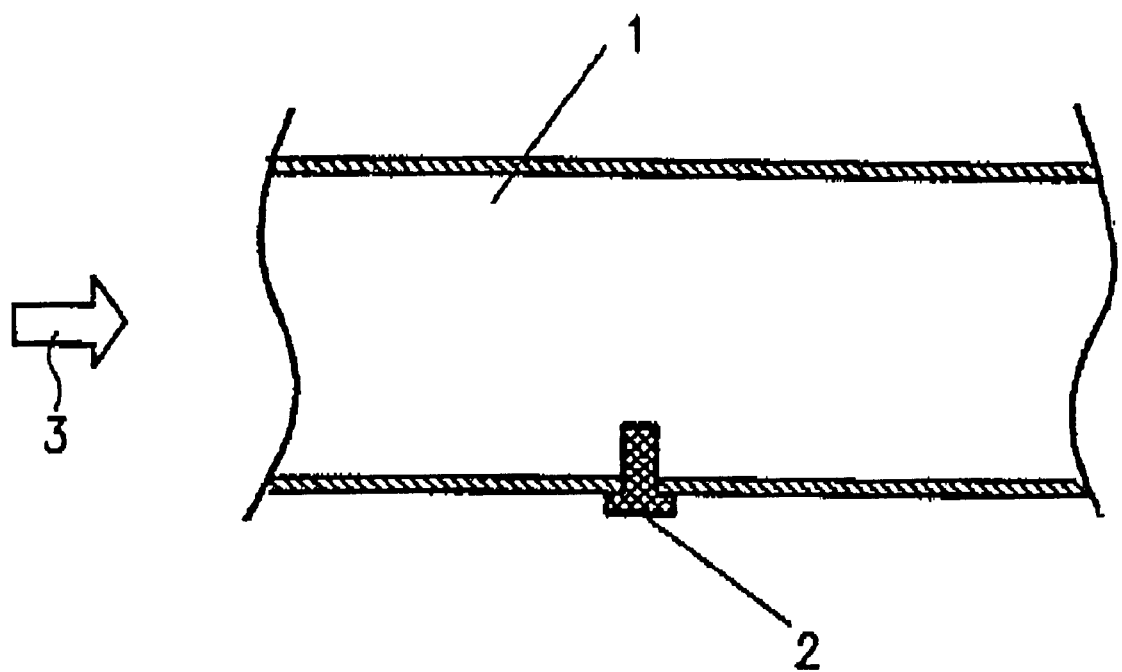
FIG. 21 is a diagram showing a flow velocity measurement section for illustrating a conventional example.
Figure 22:
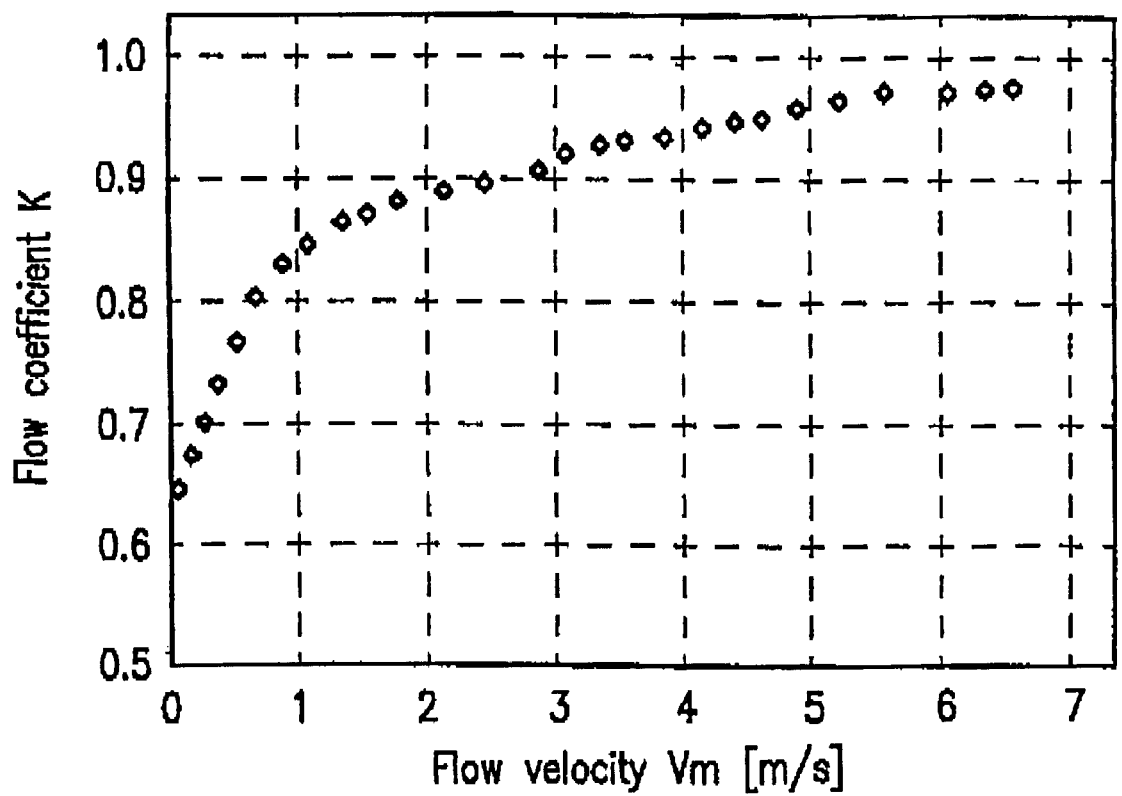
FIG. 22 is a characteristic diagram showing a flow coefficient for illustrating a conventional example.

A flow meter which uses a flow coefficient (K) obtained by the flow coefficient setting method of the present invention will be described with reference to FIG. 20. Referring to FIG. 20, the flow meter includes: a flow velocity measurement section 4 for measuring the flow velocity of a fluid; a flow coefficient memory section 8 for storing a flow coefficient which is set as described above according to the present invention; a flow rate calculation section 75 for calculating the flow rate of the fluid using the flow velocity (Vm) measured by the flow velocity measurement section 4 and the flow coefficient (K) stored in the flow coefficient memory section 8; and an output section 76 for outputting the calculated flow rate value (Qcal). When the flow velocity measurement section 4 measures the flow velocity of the fluid to be Vm, a flow coefficient (K) corresponding to the flow velocity Vm is obtained from the flow coefficient memory section 8. Then, the flow rate calculation section 75 performs a calculation Qcal=S×Vm×K, thereby obtaining the flow rate (Qcal) of the fluid. The calculation result is output to the output section 76 which includes a liquid crystal display, or the like.

As described above, the flow meter of the present invention includes the flow coefficient memory section 8 for storing the flow coefficient which is set based on the flow coefficient setting method as described above in detail. Thus, the flow meter of the present invention is capable of outputting a flow rate value with a reduced error. Even when the type of a fluid changes from that used when setting the flow coefficient, the flow coefficient can easily be converted as described above, whereby the flow meter of the present invention is still capable of outputting a flow rate value with a reduced error. Moreover, also when the temperature of the fluid changes, the flow coefficient can easily be converted as described above, whereby the flow meter of the present invention is still capable of outputting a flow rate value with a reduced error.

(Embodiment 17)

A flow meter of Embodiment 17 is similar to that described above in Embodiment 16, but the flow velocity measurement section 4 in Embodiment 17 employs a thermal type flow sensor. In other words, the flow velocity measurement section 4 has a structure as illustrated in FIG. 2. With such a structure, it is possible to provide a flow meter having a reduced error particularly in a low flow rate region. Moreover, the temperature of the fluid can be directly measured from the temperature-sensitive resistor of the thermal type flow sensor. Thus, the flow meter can be provided in a simpler structure without having to separately provide a temperature sensor for measuring the temperature of the fluid.

(Embodiment 18)

A flow meter of Embodiment 18 is similar to that described above in Embodiment 16, but the flow velocity measurement section 4 in Embodiment 18 employs a pair of ultrasonic transceivers which are provided along the fluid pipe respectively on the upstream side and the downstream side with respect to the flow velocity measurement section. In other words, the flow velocity measurement section 4 has a structure as illustrated in FIG. 3. With such a structure, it is possible to provide a flow meter having a particularly reduced error over a wide flow rate range. Moreover, the temperature of the fluid can be directly measured based on the sound velocity. Thus, the flow meter can be provided in a simpler structure without having to separately provide a temperature sensor for measuring the temperature of the fluid.

INDUSTRIAL APPLICABILITY

As is apparent from the above description, the flow coefficient setting method of the present invention first obtains a low-degree optimal approximate line using an arbitrarily selected number of consecutive data sets, and then selects (or adjusts) the number of data sets so as to select a highest possible number of data sets all within a predetermined error Er, thereby efficiently setting the optimal approximate line.

Alternatively, a high-degree function representing an optimal approximate curve may be obtained by using a number of data sets over a wide range, after which a low-degree function representing an optimal approximate line to flow coefficients is obtained based on the optimal approximate curve. In such a case, it is possible to quickly and efficiently calculate the flow coefficients over a wide range using a limited number of data sets.

An alternative flow coefficient setting method of the present invention converts a flow coefficient for one type of a fluid to a new flow coefficient for another type of a fluid by multiplying a fluid-type-dependent constant to an x-axis value. Thus, even when the type of a fluid changes from that used when setting a flow coefficient, the flow coefficient can easily be converted to a new flow coefficient for the new fluid, thereby realizing a flow coefficient with a reduced error even when there is a change in the type of a fluid.

An alternative flow coefficient setting method of the present invention converts a flow coefficient for one temperature to a new flow coefficient for another temperature by multiplying a temperature-dependent function value to an x-axis value. Thus, even when the temperature of the fluid changes from that when setting a flow coefficient, the flow coefficient can easily be converted to a new flow coefficient for the new temperature, thereby realizing a flow coefficient with a reduced error even when there is a change in the temperature of a fluid.

A flow meter using such a flow coefficient setting method can measure the flow rate of a fluid with a reduced error over a wide range of flow rates.

What is claimed is:

1. A method of setting a flow coefficient, comprising the steps of:
    obtaining an optimal approximate line of a relationship between the flow velocity of the fluid and the flow coefficient using a number n of consecutive sets of data points (Xi, Yi) of all flow velocity data points stored in a flow velocity data memory section for storing flow velocity data measured by a flow velocity measurement section, and reference data stored in a reference data memory section;
    increasing or decreasing the number n so that the n sets of data points are all within a predetermined error Er with respect to the optimal approximate line;
    performing a calculation operation for setting a region by a flow coefficient calculation section; and
    storing an obtained flow coefficient in a flow coefficient memory section.

2. A method of setting a flow coefficient according to claim 1, wherein a linear function is used to represent the optimal approximate line if the n sets of data points (Xi, Yi) are distributed on both sides of the optimal approximate line in a middle portion of the optimal approximate line.

3. A method of setting a flow coefficient according to claim 1, wherein a guadric function is used to represent the optimal approximate line if the n sets of data points (Xi, Yi) are distributed on one side of the optimal approximate line in a middle portion of the optimal approximate line.

4. A method of setting a flow coefficient, comprising the steps of:
    obtaining an optimal approximate curve of a relationship between the flow velocity of the fluid and the flow coefficient using a plurality of sets of data points (Xi, Yi) of all flow velocity data points stored in a flow velocity data memory section for storing flow velocity data measured by a flow velocity measurement section, and reference data stored in a reference data memory section;
    dividing the optimal approximate curve into a number m regions;
    performing a calculation operation for approximating each region with an optimal approximate straight line by a flow coefficient calculation section; and
    storing an obtained flow coefficient in a flow coefficient memory section.

5. A method of setting a flow coefficient according to claim 4, wherein the optimal approximate curve is equally divided into the number m of regions along a y-axis direction.

6. A method of setting a flow coefficient according to claim 4, wherein the optimal approximate curve is equally divided into the number m of regions along an x-axis direction.

7. A method of setting a flow coefficient according to claim 4, wherein the optimal approximate curve is divided into the number m of regions along an x-axis direction such that a width of each region is inversely proportional to a gradient of the optimal approximate straight line for the region.

8. A method of setting a flow coefficient according to claim 4, wherein the optimal, approximate curve is represented by $Y=a \times Log(X)+b$.

9. A method of setting a flow coefficient according to claim 4, wherein the optimal approximate curve is represented by $Y=(a-b)/[1+\exp(-c \times X)]+b$.

10. A method of setting a flow coefficient according to claim 1 or 4, wherein the flow velocity measurement section comprises a thermal type flow sensor.

11. A method of setting a flow coefficient according to claim 1 or 4, wherein the flow velocity measurement section comprises an ultrasonic flow meter.

12. A method of setting a flow coefficient according to claim 1 or 4, wherein the optimal approximate line is represented by a low-degree function which is a linear function or a quadric function.

13. A method of setting a flow coefficient according to claim 1 or 4, wherein a data point which is included by two adjacent regions is set to belong to one of the two adjacent regions in which an error Er calculated based on the optimal approximate line is smaller.

14. A method of setting a flow coefficient according to claim 1 or 4, wherein an intersection between two optimal approximate lines for two adjacent regions is used as a boundary point between the two regions.

15. A method of setting a flow coefficient according to claim 1 or 4, wherein the error Er is gradually increased until an entire data range required can be divided into a predetermined number of regions.

16. A method of setting a flow coefficient according to claim 1 or 4, wherein when a type of a fluid changes from a first fluid to a second fluid, an x-axis value of a flow coefficient is multiplied by a fluid-type-dependent constant so as to convert the flow coefficient to a new flow coefficient.

17. A method of setting a flow coefficient according to claim 16, wherein the constant is a new flow Velocity (Vm×Vg/m) which is obtained by multiplying a flow velocity ratio (Vg/Vm) to a flow velocity (Vm) of the first fluid, where Vg is a flow velocity, of the second fluid for any flow coefficient value (Ko).

18. A method of setting a flow coefficient according to claim 1 or 4, wherein when a temperature of a fluid changes from a first temperature to a second temperature, an x-axis value of a flow coefficient is multiplied by a temperature-dependent function value so as to convert the flow coefficient to a new flow coefficient.

19. A method of setting a flow coefficient according to claim 18, wherein the function value used for obtaining the new flow coefficient is calculated by the following expression:

$$Vi(Ts/Ti)^p$$

where Ts denotes the first temperature, Ti denotes the second temperature, Vi denotes a flow velocity of the fluid measured at Ti, and p denotes an exponent.

20. A method of setting a flow coefficient according to claim 19, wherein an absolute temperature (Tm) of the fluid is determined from an ultrasonic wave propagation time from an ultrasonic flow meter.

21. A method of setting a flow coefficient according to claim 18, wherein an absolute temperature (Tm) of the fluid is determined from a temperature-sensitive resistor of a thermal type flow sensor.

22. A flow meter, comprising:
- a flow velocity measurement section for measuring a flow velocity of a fluid;
- a flow coefficient memory section for storing a flow coefficient which is set by a method of setting a flow coefficient according to claim 1 or 4; and
- a flow rate calculation section for calculating a flow rate of the fluid from the measured flow velocity using the flow coefficient stored in the flow coefficient memory section.

23. A flow meter according to claim 22, wherein the flow velocity measurement section comprises a thermal type flow sensor.

24. A flow meter according to claim 22, wherein the flow velocity measurement section comprises an ultrasonic flow meter.

* * * * *